United States Patent
Roeland et al.

(10) Patent No.: US 11,516,639 B2
(45) Date of Patent: Nov. 29, 2022

(54) REQUESTING FLEXIBLE USER-PLANE SERVICES IN A SERVICE-BASED ARCHITECTURE

(71) Applicant: Telefonaktiebolaget LM Ericsson (publ), Stockholm (SE)

(72) Inventors: Dinand Roeland, Sollentuna (SE); András Zahemszky, Sollentuna (SE); Balázs Pinczel, Budapest (HU); Zoltán Turányi, Szentendre (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 16/976,133

(22) PCT Filed: Feb. 26, 2019

(86) PCT No.: PCT/SE2019/050170
§ 371 (c)(1),
(2) Date: Aug. 27, 2020

(87) PCT Pub. No.: WO2019/168458
PCT Pub. Date: Sep. 6, 2019

(65) Prior Publication Data
US 2020/0413236 A1     Dec. 31, 2020

Related U.S. Application Data

(60) Provisional application No. 62/636,372, filed on Feb. 28, 2018.

(51) Int. Cl.
*H04L 41/5041* (2022.01)
*H04L 45/302* (2022.01)
(Continued)

(52) U.S. Cl.
CPC ........... *H04W 4/50* (2018.02); *H04L 41/5048* (2013.01); *H04W 8/22* (2013.01)

(58) Field of Classification Search
CPC ...... H04W 4/50; H04W 8/22; H04L 41/5048; H04L 41/5054; H04L 45/306
See application file for complete search history.

(56) References Cited

U.S. PATENT DOCUMENTS

| 2017/0155724 A1* | 6/2017 | Haddad | H04L 61/503 |
| 2017/0161053 A1* | 6/2017 | Hayakawa | G06F 9/44536 |
| 2017/0346704 A1* | 11/2017 | Strijkers | G06F 9/5005 |

FOREIGN PATENT DOCUMENTS

| WO | 2016202363 A1 | 12/2016 | |
| WO | WO-2019118263 A1 * | 6/2019 | ......... H04L 41/0893 |

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 15)," Technical Specification (TS) 23.401, Version 15.2.0, 3GPP Organizational Partners, Dec. 2017, 404 pages.

(Continued)

*Primary Examiner* — Joseph E Dean, Jr.
(74) *Attorney, Agent, or Firm* — Withrow & Terranova, PLLC

(57) ABSTRACT

Embodiments of a method of operation of a service requestor to request a service from a chain controller in a cellular communications network in which a user plane function is decomposed into a plurality of micro user plane functions are disclosed. In some embodiments, the method comprises sending, to the chain controller, a service description or a request to update a service description. The service description comprises one or more service template instances having respective service template definitions. Each service template definition of the respective service template definitions being data that defines a set of micro user plane functions that realize a service or a part of a service. Each service template instance of the one or more service template instances comprises data that defines a reference to the respective service template definition. The method further comprises receiving a reply from the chain controller.

24 Claims, 18 Drawing Sheets

(51) Int. Cl.
  *H04W 4/50* (2018.01)
  *H04W 8/22* (2009.01)

(56) References Cited

OTHER PUBLICATIONS

Author Unknown, "Technical Specification Group Services and System Aspects; System Architecture for the 5G System; Stage 2 (Release 15)," Technical Specification (TS) 23.501, Version 15.0.0, 3GPP Organizational Partners, Dec. 2017, 181 pages.
Author Unknown, "Technical Specification Group Services and System Aspects; Procedures for the 5G System; Stage 2 (Release 15)," Technical Specification (TS) 23.502, Version 15.0.0, 3GPP Organizational Partners, Dec. 2017, 258 pages.
Mechtri, Marouen, et al., "NFV Orchestration Framework Addressing SFC Challenges," Advances in Networking Software, IEEE Communications Magazine, Jun. 2017, pp. 16-23.
NGMN Alliance, "Service-Based Architecture in 5G," Next Generation Mobile Networks (NGMN), Version 1.0, NGMN Ltd., Jan. 19, 2018, 18 pages.
International Search Report and Written Opinion for International Patent Application No. PCT/SE2019/050170, dated May 27, 2019, 11 pages.

* cited by examiner

REQUESTING FLEXIBLE USER-PLANE SERVICES IN A SERVICE-BASED ARCHITECTURE

RELATED APPLICATIONS

This application is a 35 U.S.C. § 371 national phase filing of International Application No. PCT/SE2019/050170, filed Feb. 26, 2019, which claims the benefit of provisional patent application Ser. No. 62/636,372, filed Feb. 28, 2018, the disclosures of which are hereby incorporated herein by reference in their entireties.

TECHNICAL FIELD

The present disclosure relates to a service-based architecture of a core network of a cellular communications system and, more specifically, to an architecture in which a User Plane Function (UPF) is decomposed into a number of micro UPFs.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The Third Generation Partnership Project (3GPP) Evolved Packet Core (EPC) architecture [3GPP Technical Specification (TS) 23.401] consists of large monolithic functional entities. In the control plane these entities include the Mobility Management Entity (MME) for mobility handling and the Policy and Charging Rules Function (PCRF) for policy handling. The 3GPP standards specify the logical interfaces between different functional entities. Aspects like resilience and scalability of the entities are not specified in standards, but left to vendors as implementation aspects.

The 3GPP Fifth Generation (5G) core for the control plane follows a different paradigm where the large monolithic functional entities may be split up into smaller network functions. Network functions are connected to each other via a logical communication bus. A network function instance is registered to a Network Repository Function (NRF). Using the NRF, a network function instance can find other network function instances to communicate with. FIG. 1 shows the 5G system architecture. See 3GPP TS 23.501 (Version 15.0.0) for further details. This way of modelling the system is also known as "service-based architecture." The goal of such service-based architecture is to get a higher flexibility in the overall system, making it easier to introduce new services.

In the new 3GPP architecture, the User Plane Function (UPF) is still a large monolithic entity, even though the specification allows to chain multiple UPFs. This idea can be taken one step further by decomposing the UPF into many small micro UPFs (μUPFs). Depending on the requirements and the use case, it is possible to recompose a set of μUPFs into a service chain for a user. This approach of building the user plane has three main advantages: 1) flexibility is introduced to support very diverse 5G use cases; 2) Time-To-Market (TTM) can be shortened to introduce new services; and 3) techniques from cloud-based design can be leveraged.

FIG. 2 shows decomposing a network function into multiple μUPFs. The decomposition into μUPFs can be applied to the 3GPP UPF, but just as well to SGi/N6 functions, to parts of a virtual Radio Access Network (RAN), and to fixed network components like, e.g., a virtual Broadband Network Gateway (vBNG).

The μUPFs are hosted on user plane nodes. It is possible that a single service chain spans across multiple user plane nodes, for example some μUPFs are located in a central site, while some μUPFs are located in the local site for a given user.

An example of chaining via multiple user plane nodes is shown in FIG. 3. In FIG. 3, there are two user plane nodes, one central and one local. F1-F4 are μUPFs. There are also entry and exit μUPFs denoted by "En/Ex." Entry μUPFs typically perform demultiplexing and decapsulation, while exit μUPFs perform encapsulation of the packets. The device's service is composed of three chains. The red chain is for communicating with a peer on the Internet: the downlink packets go via Entry-F2-Exit-Entry-F1-Exit. The yellow chain is for communicating with a centralized server, e.g. a Content Delivery Network (CDN) server, while the green chain is with a localized server. All the device's traffic has to pass the μUPF F1.

A new functional component in this approach is referred to herein as Chain Controller (CC). The Session Management Function (SMF) is the entity that requests a service for the user. It does so by providing a service description to the CC. Note that this requires an update to the SMF as currently defined by 3GPP. The service description is a reference to one or more service templates, with parameters filled in. A service template is a collection of μUPFs that realize a service or a part of a service. FIG. 4 gives an example of a service template defining a service "flow."

The CC's overall responsibility is to make sure that the requested service is instantiated for the user in the user plane nodes. At a high-level, it does its task by identifying which μUPFs are needed for the requested service, in which order the user plane packets should traverse through the μUPFs, and on which user plane nodes the identified μUPFs should be executed for the given user. The CC includes multiple modules, which are referred to herein as a combiner module, a placement module, and a Southbound Interface (SBI) translator.

The combiner module's task is to retrieve the service templates that are referred to in the service description and determine the μUPFs that will be used to realize the service. This collection of μUPFs is called a service set. The service set is sent to the placement module.

The placement module decides which μUPFs will be run on which user plane nodes. If needed, it splits the service set into multiple service subsets and sends the appropriate service subsets to the appropriate placement and, ultimately, SBI translator modules responsible for the given user plane node.

The SBI translator is responsible for installing the forwarding rules to the user plane node, by translating between the service (sub)set and the protocol used to control the user plane node (called Control Plane—User Plane (CP-UP) protocol).

A simplified view of the architecture is presented in FIG. 5. FIG. 6 is another view of the architecture of the CC. FIG. 6 is essentially the same as FIG. 5 but in a service-based architecture style.

The CC also has the responsibility to allocate identity objects to the user, if such objects are defined in the service template. For example, an Internet Protocol version 4 (IPv4) address or Internet Protocol version 6 (IPv6) prefix, or a Tunnel Endpoint Identifier (TEID) which will be used to demultiplex the uplink traffic and identify the right user, in case General Packet Radio Service Tunneling Protocol User Plane (GTP-U) is used between the base station and the user plane nodes. Objects like address/prefix and TEID are typically associated with the user plane node that runs the user plane for the certain user.

A single service may span multiple user plane nodes. If that is the case, encapsulation may be used between the user plane nodes. If the protocol is GTP-U, a TEID must be allocated in both user plane nodes, which must be used by the sending entity when encapsulating the packets, so the receiving end can correctly identify the user.

There currently exist certain challenge(s) when attempting to implement distributed and decomposed UPFs.

Problem 1

Currently there is no flexible generic way of allocating identifiers to users when the user plane is distributed and decomposed into small μUPFs.

This allocation cannot be done in the SMF as the SMF has no knowledge which user plane nodes the CC will select. For example, the selected Internet Protocol (IP) address may depend on where the first downlink UPF resides (anchoring). Also, the selected TEID for the uplink traffic from the base station should depend on where the first UPF in the uplink direction resides.

Problem 2

The mechanisms described above allow for a very flexible configuration and reconfiguration of the service provided by the user plane. The inventors believe this is required to support the very diverse use cases that will be seen in 5G. The solution described in the background section assumes that there is a (modified) SMF that requests the user plane service for a user. It does so by sending a service description consisting of one or more service template references with filled-in input parameters. Comparing this to today's 5G core, the SMF can only request certain services from a UPF that are predefined in the 3GPP specification. There are limited means to introduce new services without having to go through a lengthy standardization process.

Problem 3

The mechanisms described above allow for a very flexible configuration and reconfiguration of the service provided by the user plane. The inventors believe this is required to support the very diverse use cases that will be seen in 5G. The solution described in the background section assumes that there is an SBI function that translates a service set into commands to configure the user plane. This translation is not trivial and the present disclosure proposes a solution.

SUMMARY

Systems and methods are disclosed herein for providing flexible configuration and/or reconfiguration of service(s) provided by a User Plane Function (UPF) in a cellular communications network. Embodiments of a method of operation of a service requestor to request a service from a Chain Controller (CC) in a cellular communications network in which a UPF is decomposed into a plurality of micro UPFs (μUPFs) are provided. In some embodiments, the method comprises sending, to the CC, a service description or a request to update a service description. The service description comprises one or more service template instances, the one or more service template instances having respective service template definitions. Each service template definition of the respective service template definitions being data that defines a set of μUPFs that realize a service or a part of a service. Each service template instance of the one or more service template instances comprises data that defines a reference to the respective service template definition. The method further comprises receiving a reply from the CC. In this manner, flexible configuration and/or reconfiguration of service(s) provided by the UPF is provided.

In some embodiments, the method further comprises, prior to sending the service description to the CC, obtaining a plurality of service template instances for a wireless device, wherein the one or more service template instances comprised in the service description comprise some or all of the plurality of service template instances obtained for the wireless device. Further, in some embodiments, obtaining the plurality of service template instances for the wireless device comprises obtaining a profile of the wireless device, the profile comprising the plurality of service template instances for the wireless device.

In some embodiments, each service template instance of the one or more service template instances further comprises one or more input values for one or more input parameters of the respective service template definition. Further, in some embodiments, the method further comprises, prior to sending the service description to the CC, obtaining: a plurality of service template instances for a wireless device, wherein the one or more service template instances comprised in the service description comprise some or all of the plurality of service template instances obtained for the wireless device; and, for each service template instance of at least a subset of the plurality of service template instances for the wireless device, one or more input values for one or more input parameters for the service template instance. Further, in some embodiments, obtaining the plurality of service template instances for the wireless device and the one or more input values for the one or more input parameters for each of the at least a subset of the plurality of service template instances for the wireless device comprises obtaining a profile of the wireless device, the profile comprising the plurality of service template instances for the wireless device and the one or more input values for the one or more input parameters for each of the at least a subset of the plurality of service template instances for the wireless device.

In some embodiments, the method further comprises building the service description, wherein building the service description comprises selecting one or more of the plurality of service template instances for the wireless device as the one or more service template instances for the service description. In some embodiments, building the service description further comprises mapping at least one parameter value for at least one of the one or more service template instances from information of incoming events.

In some embodiments, one of the one or more service template instances inherits another one of the one or more service template instances.

In some embodiments, the one or more service template instances comprise instances of at least two different service templates.

In some embodiments, the reply comprises one or more output parameters. Further, in some embodiments, the method further comprises processing the one or more output parameters.

In some embodiments, the service requestor is a first network function implemented in a first network node comprised in a core network of a cellular communications system, and the CC and the plurality of μUPFs are implemented in one or more second network nodes comprised in the core network.

In some embodiments, the service requestor is a Session Management Function (SMF) comprised in a core network of a Fifth Generation (5G) cellular communications system, and the UPF that is decomposed into the plurality of μUPFs is a UPF comprised in the core network of the 5G cellular communications system.

Embodiments of a network node that implements a service requestor to request a service from a CC in a cellular communications network in which a UPF is decomposed into a plurality of μUPFs are also disclosed. In some embodiments, the network node implements the service requestor, wherein the service requestor is adapted to send, to the CC, a service description or a request to update a service description. The service description comprises one or more service template instances, the one or more service template instances having respective service template definitions. Each service template definition of the respective service template definitions being data that defines a set of μUPFs that realize a service or a part of a service. Each service template instance of the one or more service template instances comprises data that defines a reference to the respective service template definition. The service requestor is further adapted to receive a reply from the CC.

In some other embodiments, a network node on which a service requestor is implemented in a cellular communications network in which a UPF is decomposed into a plurality of μUPFs comprises a network interface, one or more processors, and memory comprising instructions executable by the one or more processors whereby the network node is operable to implement the service requestor, wherein the service requestor is operable to send, to a CC, a service description or a request to update a service description. The service description comprises one or more service template instances, the one or more service template instances having respective service template definitions. Each service template definition of the respective service template definitions being data that defines a set of μUPFs that realize a service or a part of a service. Each service template instance of the one or more service template instances comprises data that defines a reference to the respective service template definition. The service request is further operable to receive a reply from the CC.

Embodiments of a method of operation of a CC in a cellular communications network in which a UPF is decomposed into a plurality of μUPFs are also disclosed. In some embodiments, the method comprises receiving, from a service requestor, a service description comprising one or more service template instances, the one or more service template instances having respective service template definitions. Each service template definition of the respective service template definitions comprises data that defines a set of μUPFs that realize a service or a part of a service. Each service template instance of the one or more service template instances comprises data that defines a reference to the respective service template definition. The method further comprises generating a service set based on the service description, the service set comprising a list of μUPFs, and assigning each μUPF in the list of μUPFs comprised in the service set to a user plane node.

In some embodiments, the method further comprises returning a reply to the service requestor. In some embodiments, the reply comprises one or more output parameters.

In some embodiments, the service set further comprises one or more ordering constraints for the μUPFs comprised in the list of μUPFs.

In some embodiments, one of the one or more service template instances inherits another one of the one or more service template instances.

In some embodiments, the one or more service template instances comprise instances of at least two different service templates.

In some embodiments, the reply comprises one or more output parameters.

In some embodiments, the service requestor is a first network function implemented in a first network node comprised in a core network of a cellular communications system, and the CC and the plurality of μUPFs are implemented in one or more second network nodes comprised in the core network.

In some embodiments, the service requestor is a SMF comprised in a core network of a 5G cellular communications system, and the UPF that is decomposed into the plurality of μUPFs is a UPF comprised in the core network of the 5G cellular communications system.

Embodiments of a network node that implements a CC in a cellular communications network in which a UPF is decomposed into a plurality of μUPFs are also disclosed. In some embodiments, the network node implements the CC, wherein the CC is adapted to receive, from a service requestor, a service description comprising one or more service template instances, the one or more service template instances having respective service template definitions. Each service template definition of the respective service template definitions comprises data that defines a set of μUPFs that realize a service or a part of a service. Each service template instance of the one or more service template instances comprises data that defines a reference to the respective service template definition. The CC is further adapted to generate a service set based on the service description, the service set comprising a list of μUPFs, and assign each μUPF in the list of μUPFs comprised in the service set to a user plane node.

In some embodiments, a network node on which a CC is implemented in a cellular communications network in which a UPF is decomposed into a plurality of μUPFs comprises a network interface, one or more processors, and memory comprising instructions executable by the one or more processors whereby the network node is operable to implement the CC, wherein the CC is operable to receive, from a service requestor, a service description comprising one or more service template instances, the one or more service template instances having respective service template definitions. Each service template definition of the respective service template definitions comprises data that defines a set of μUPFs that realize a service or a part of a service. Each service template instance of the one or more service template instances comprises data that defines a reference to the respective service template definition. The CC is further operable to generate a service set based on the service description, the service set comprising a list of μUPFs and assign each μUPF in the list of μUPFs comprised in the service set to a user plane node.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
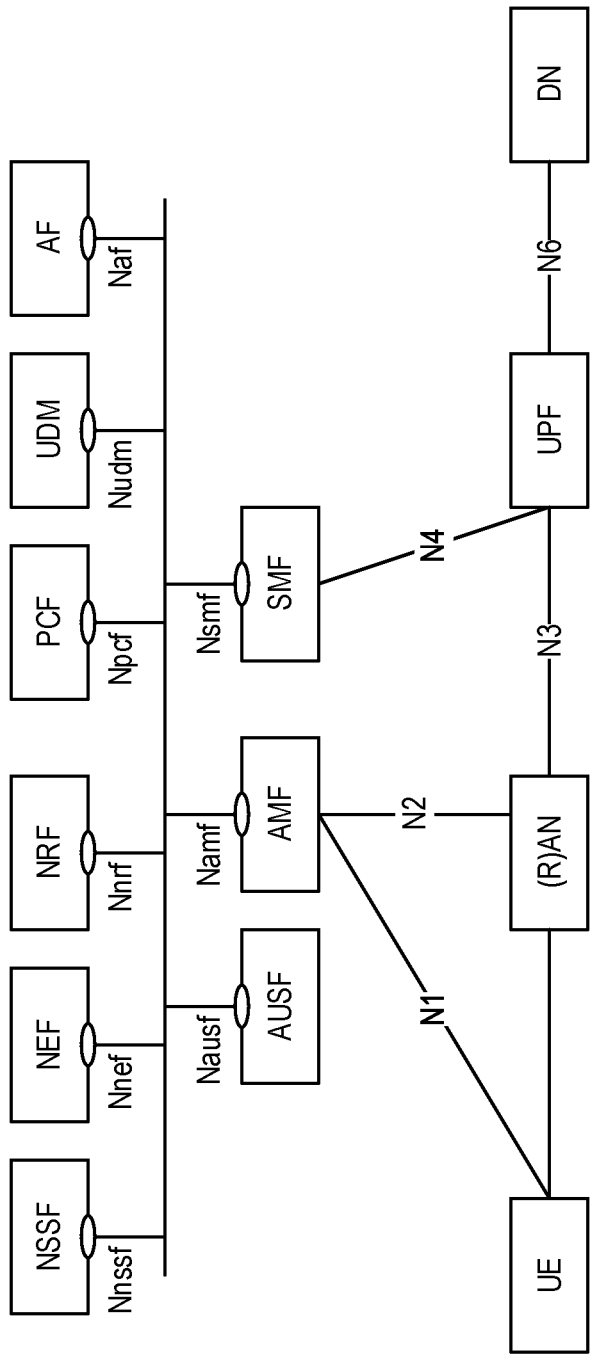
FIG. 1 illustrates the Fifth Generation (5G) system architecture.
Figure 2:
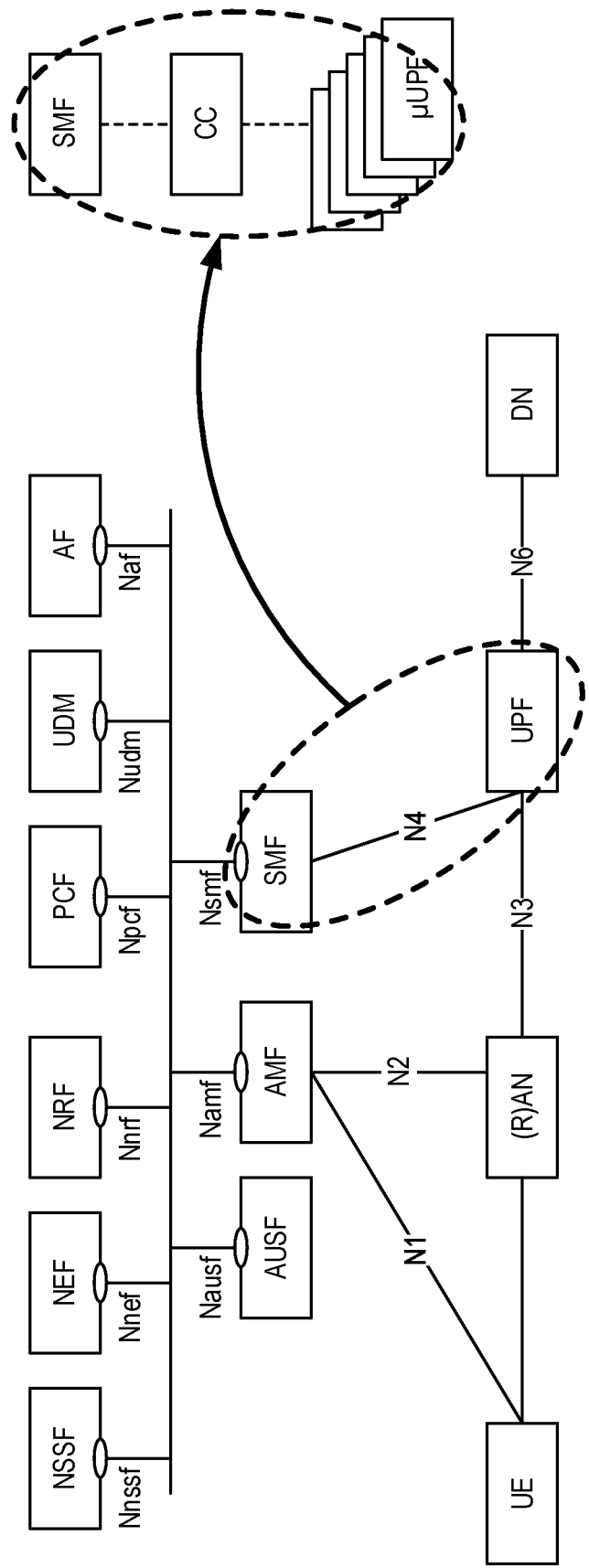
FIG. 2 illustrates decomposing a network function into multiple micro User Plane Functions (μUPFs)
Figure 3:
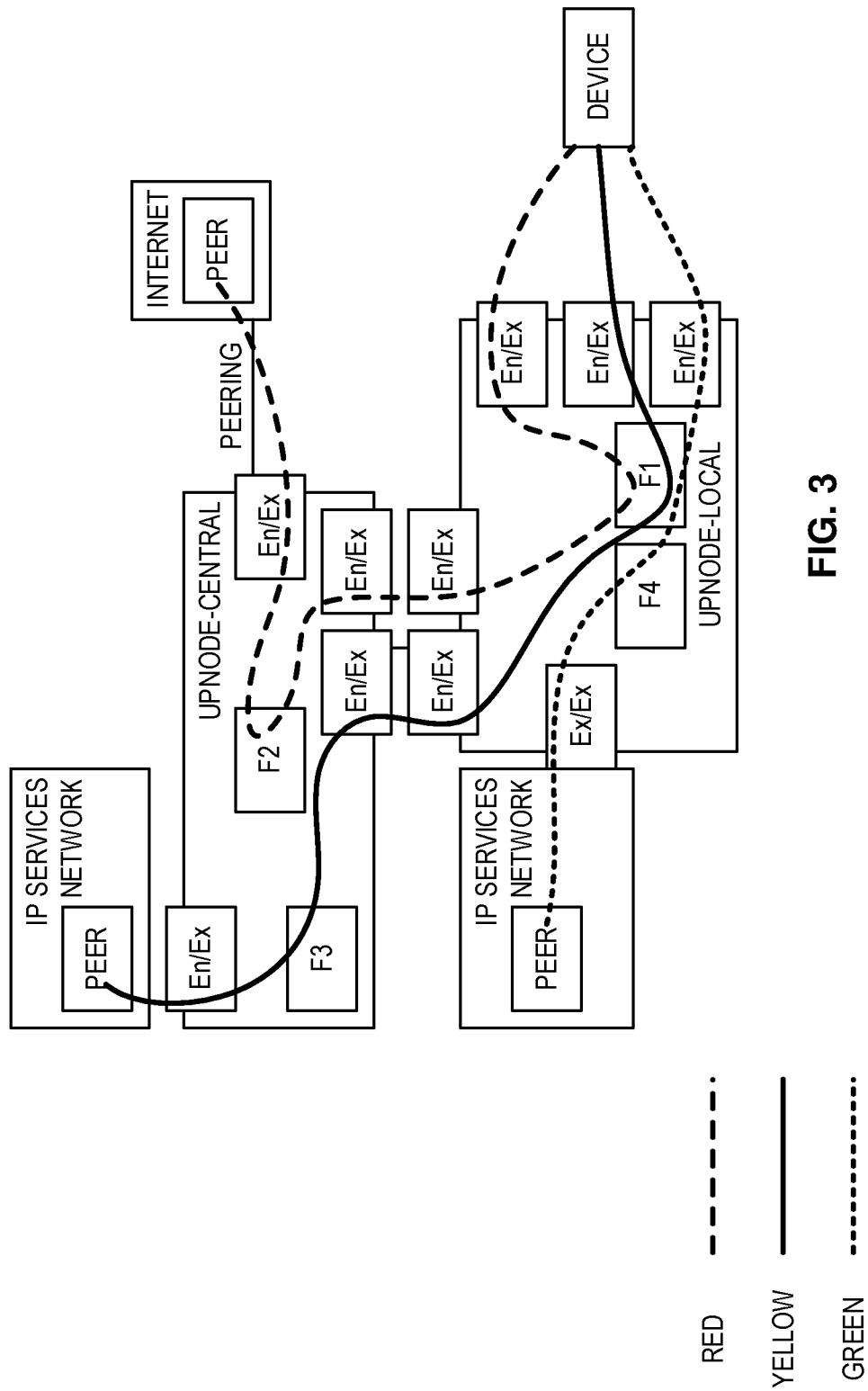
FIG. 3 illustrates an example of chaining via multiple user plane nodes.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Certain aspects of the present disclosure and their embodiments may provide solutions to the aforementioned or other challenges.

There are, proposed herein, various embodiments which address one or more of the issues disclosed herein.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Service Description: As used herein, a service description includes one or more service template instances. In other words, a service description is data that: (a) references one or more service template definitions and (b) includes input values for any input parameters for the service template definitions.

Service Template Definition: As used herein, a service template definition is data that defines a collection of micro User Plane Functions (μUPFs) that realize a service or a part of a service. A service template definition typically includes one or more input parameters.

Service Template Instance: As used herein, a service template instance is data that includes a reference to a service template definition and input values for one or more parameters defined by the service template definition. Note that the term "service template" is sometimes used herein and, depending on the context, may refer to either a service template definition or a service template instance, as will be understood by one of skill in the art.

Service Set: As used herein, a service set is a list, or collection, of μUPF instances, each having a unique name, that collectively provide an instantiation of a requested service description.

μUPF: As used herein, a μUPF or "micro user plane function" is subcomponent of a User Plane Function (UPF). In other words, the UPF is decomposed into multiple μUPFs, where the μUPFs can be installed on the same user plane node, installed on different user plane nodes, or some combination thereof. In general, a μUPF is capable of processing user plane packets. A μUPF may store per-user context. This context is then usually modified for every user plane packet. A μUPF may have one or more parameters which further control its behavior. For example, a bandwidth limiter has a bitrate parameter that controls its policing behavior.

μUPF Instance: As used herein, a μUPF instance or "micro user plane function instance" is one instance of a μUPF. For example, a service set may include multiple instances of the same μUPF.

Service Chain Graph: A service chain graph includes one or more branches for traversing the μUPF instances in a service set. A branch is defined as a set of edges. An edge defines a connection between an output port of one μUPF instance in the service set and an input port of another μUPF instance in the service set.

Note that the description given herein focuses on a Third Generation Partnership Project (3GPP) cellular communications system and, as such, 3GPP terminology or terminology similar to 3GPP terminology is oftentimes used. However, the concepts disclosed herein are not limited to a 3GPP system.

Also note that that a number of "solutions" are described below. While described separately, these solutions may be used in any desired combination. Further, details described for one solution may also be applicable to another solution.

Solution 1 (Solution for Problem 1)

Systems and methods are disclosed herein that relate to including "assign objects" in the service templates. In some embodiments, μUPF instances given in a service template are associated with assign objects. The assign object provides a flexible and generic way of allocating identifiers to users when the user plane is distributed and decomposed into small μUPFs.

Certain embodiments may provide one or more of the following technical advantage(s). For example, since assign objects are defined in service templates, updating or changing assign objects is more flexible then the hard-coded (and often standardized) definitions in today's mobile networks. As another example, since definition, instantiation, placement, and assignment of assign objects are handled by different modules, a further flexibility is introduced in handling assign objects.

Systems and methods are disclosed herein that relate to including "assign objects" in service template definitions utilized by a Chain Controller (CC) (i.e., a CC module). In some embodiments, an assign object has a name, a type, and a pool name. The assign object's type indicates the value type of the allocated Identity (ID) (e.g., ipv4 means that an Internet Protocol version 4 (IPv4) address has to be allocated to the user). A single user plane node may manage multiple named pools of the same value type. The pool name of the assign object indicates from which one of these pools the value must be allocated.

In some embodiments, μUPF instances are associated with assign objects. In some embodiments, μUPF instances are associated with assign objects with the following semantics: if an assign object is associated with a μUPF instance, the value of the assign object should be selected from a pool, which is managed by the user plane node where the μUPF instance is selected to run. The pool type and name should match the ones in the assign object.

Figure 4:
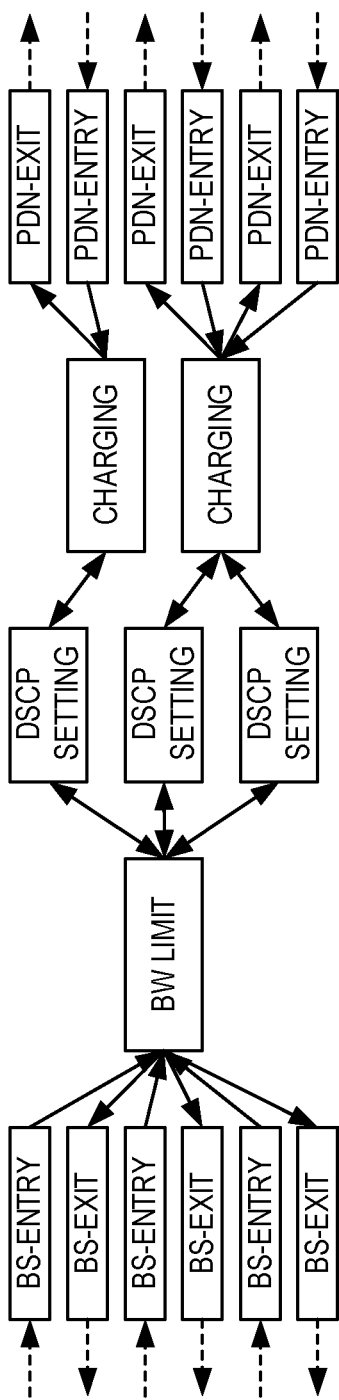
FIG. 4 illustrates an example of a service template defining a service flow.
Figure 5:
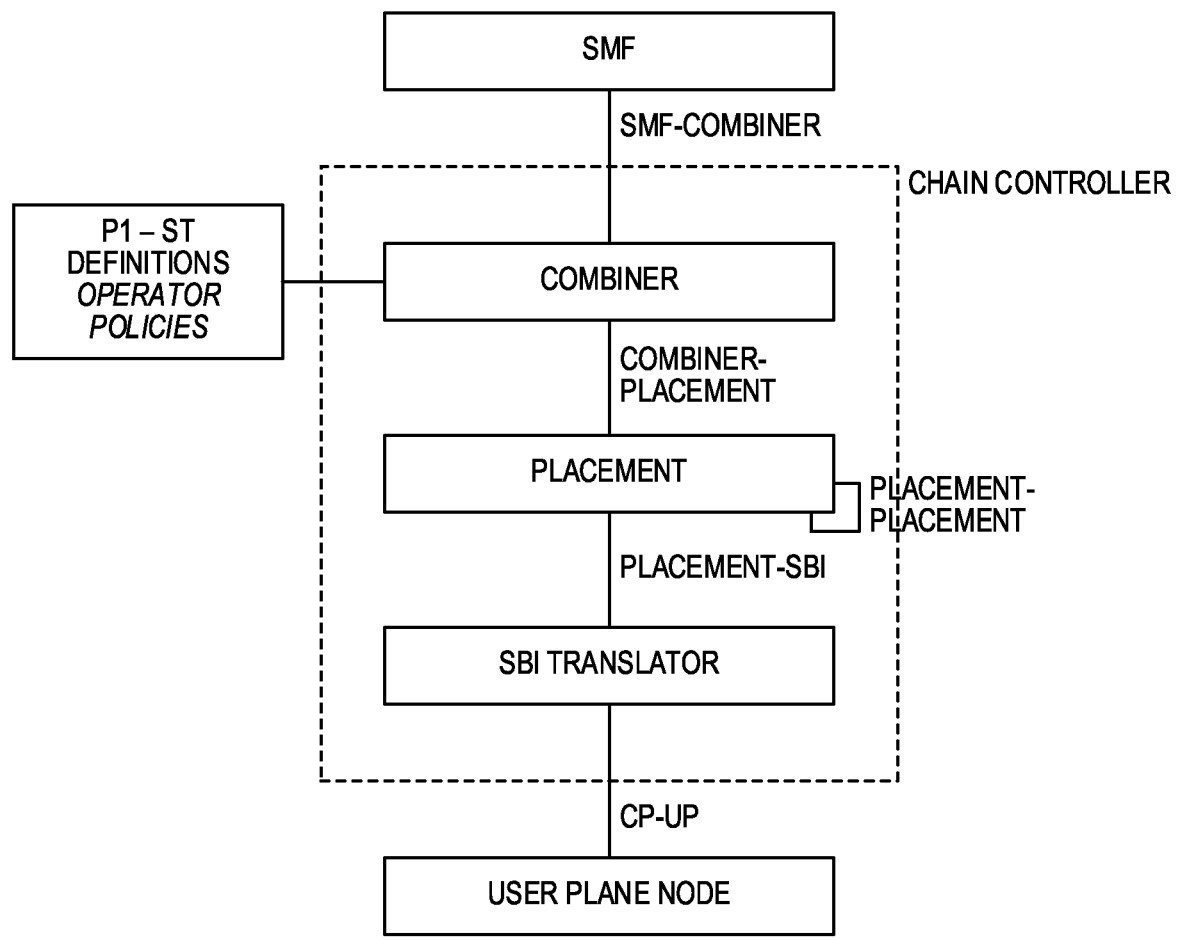
FIG. 5 illustrates an architecture of a Chain Controller (CC) in accordance with embodiments of the present disclosure.
Figure 6:
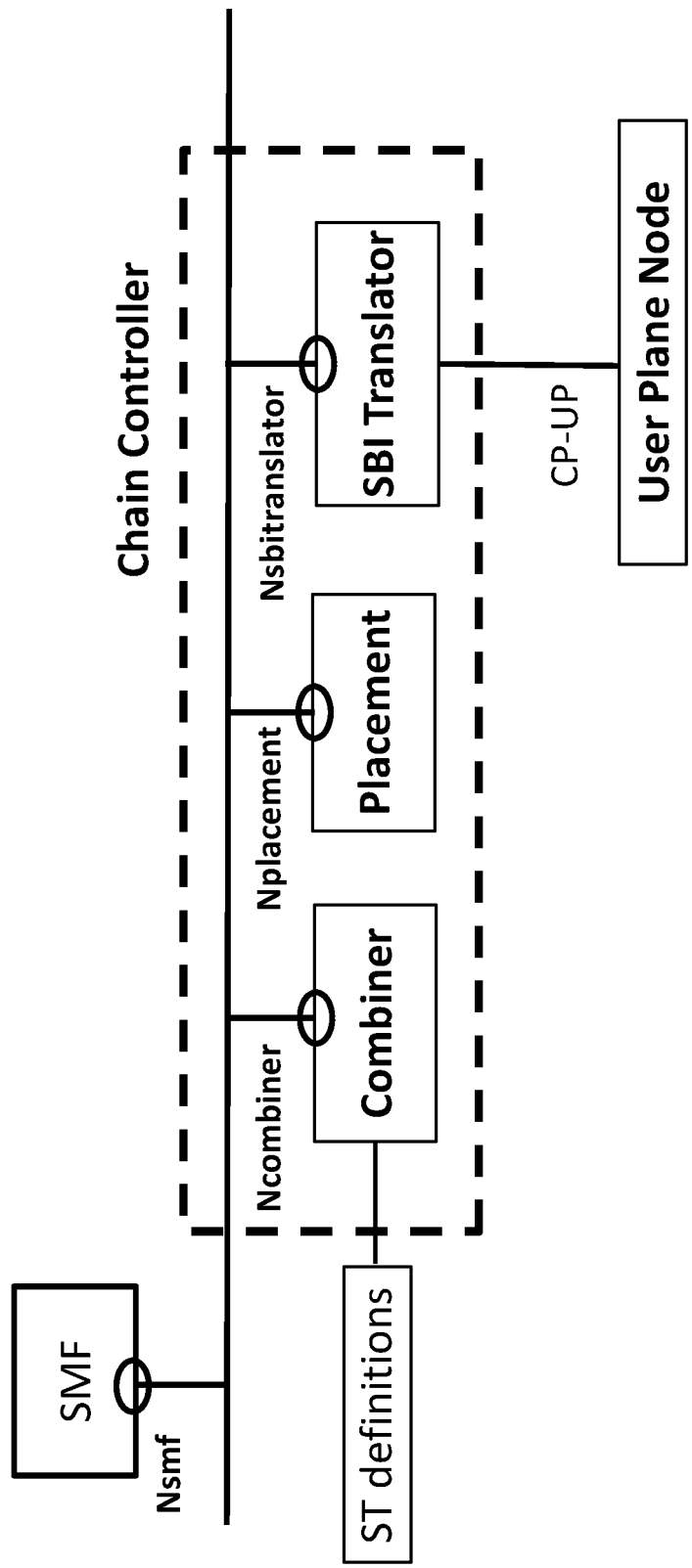
FIG. 6 illustrates another view of the architecture of the CC in accordance with embodiments of the present disclosure.
Figure 7:
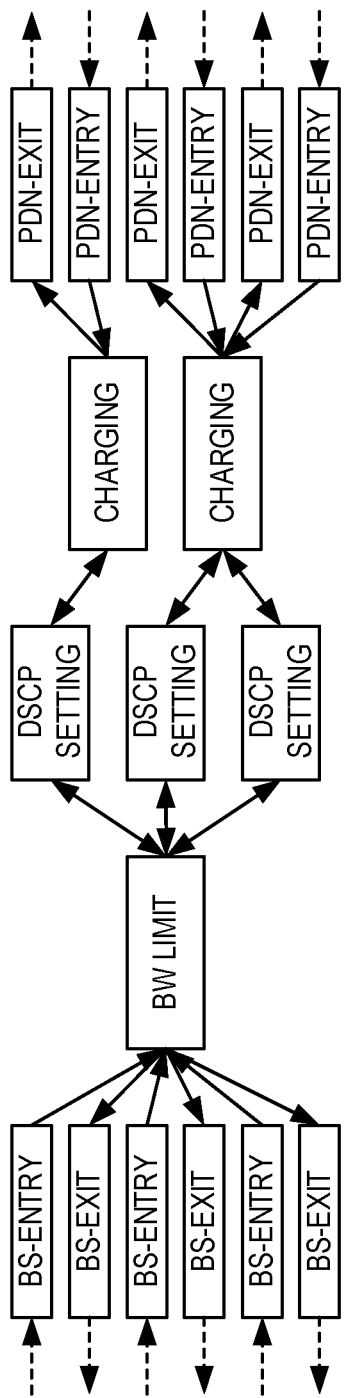
FIG. 7 illustrates the example of a service template of FIG. 4 but extended to include assign objects in accordance with some embodiments of the present disclosure.

Assume the following example: an assign object called assign has type ipv4, and pool name device_ipv4. A μUPF instance named entry is associated with assign. The CC selects User Plane Node1 as the place to execute the entry_upf μUPF instance. By associating assign and entry, the IPv4 address for the user will be selected from an address pool belonging to User Plane Node1. FIG. 7 illustrates the example from FIG. 4 but further extended with the feature of assign objects.

In some embodiments, a way for the CC modules to handle assign objects is provided such so that IDs are (e.g., always) allocated from the correct pool.

In some embodiments, the type of the assign object indicates the value type of the pool from which the ID must be allocated. The pool name is a pointer to a pool, and it may define the purpose for which the value will be used. For example, a type of ipv4 and pool name device_ipv4 means an Internet Protocol (IP) address pool used for device IP addresses, while type uint32 and pool name gtp_teid means a Tunnel Endpoint Identifier (TEID) pool containing TEIDs used for decapsulation. As another example, Upnode_ipv4 is a special pool, with one or more addresses, where there is no requirement on uniqueness, i.e. multiple assign objects are allowed to be resolved to the same value. This is different from, e.g., the device_ipv4 pool, where one address can be given only to a single user. The exact pools, their value ranges, and requirement for uniqueness has to be configured in the module that manages the pools, i.e. the Southbound Interface (SBI) translator. More examples are listed below.

As becomes clear from the above, an assign object is defined in a service template definition. It may be used as parameter for μUPF instances in a service template instance defined by that service template definition or in another service template instance defined by another service template definition that refers to the first service template instance. The service template definition also defines a placement association between assign object and one or more μUPFs.

Multiple examples for defining assign objects in a service template definition and explaining their semantics are listed below.

1) An assign object called assign has type ipv4 and pool name device_ipv4. A μUPF instance named dl_entry is associated with assign. The CC selects User Plane Node1 as the place to execute the dl_entry μUPF instance. By associating assign and dl_entry, the IPv4 address for the user will be selected from an address pool belonging to User Plane Node1. The pool has the name device_ipv4.

2) An assign object called assign has type uint32 and pool name gtp_teid. A μUPF instance named ul_entry is associated with assign. The CC selects User Plane Node1 as the place to execute the ul_entry μUPF instance. By associating assign and ul_entry, the TEID for the user will be selected from the TEID pool named gtp_teid belonging to User Plane Node1.

3) An assign object called assign has type ipv4 and pool name upnode_ipv4. A μUPF instance named ul_entry is associated with assign. The CC selects User Plane Node1 as the place to execute the ul_entry μUPF instance. By associating assign and ul_entry, the IPv4 address that is used to address the user plane node where ul_entry resides will be the IP address of User Plane Node1.

4) An assign object called assign1 has type iv4 and pool name device_mbb_ipv4. A μUPF instance named dl_entry is associated with assign1. The CC selects User Plane Node1 as the place to execute the dl_entry μUPF instance. By associating assign1 and dl_entry, the IPv4 address for the user will be selected from an address pool belonging to User Plane Node1. The pool has the name device_mbb_ipv4 and this is used for allocating IPv4 addresses to Mobile Broadband (MBB) devices (e.g., smartphones or tablets). The user plane node (User Plane Node1) may maintain other pools, too, e.g. device_iot_ipv4 is used for Internet of Things (IoT) devices (e.g., sensors).

Many other examples can be envisioned. One other typical example can be when for reaching different Data Networks (DNs), the user receives IP addresses from different pools. For instance, a separate IP address pool is maintained in the same user plane node for connecting to the Internet, or the Voice over Long Term Evolution (VoLTE) network.

Figure 8A:
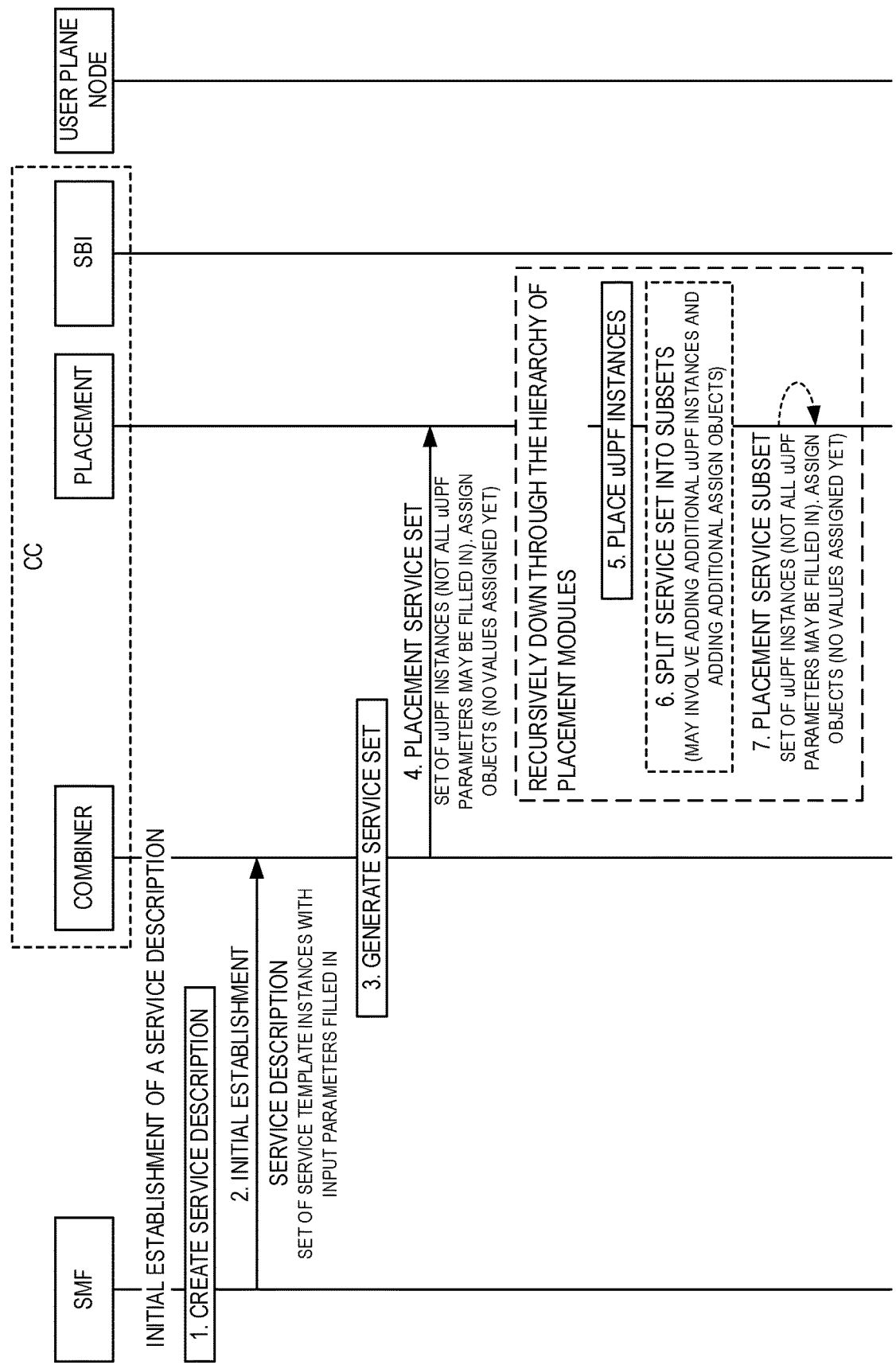
FIGS. 8A through 8C illustrate one example of a method of defining and using assign objects in accordance with some embodiments of the present disclosure.
Figure 8B:
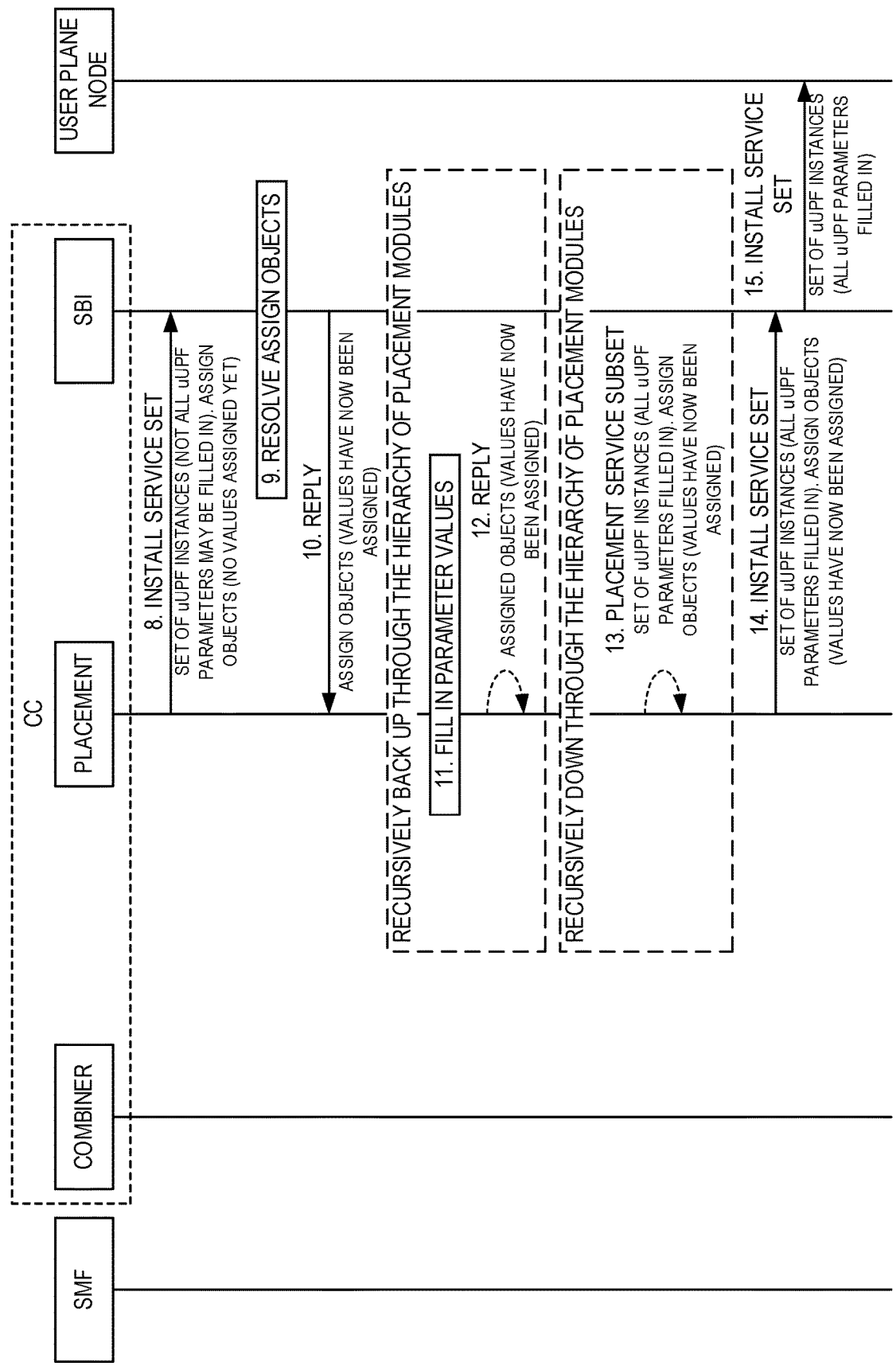
Figure 8C:
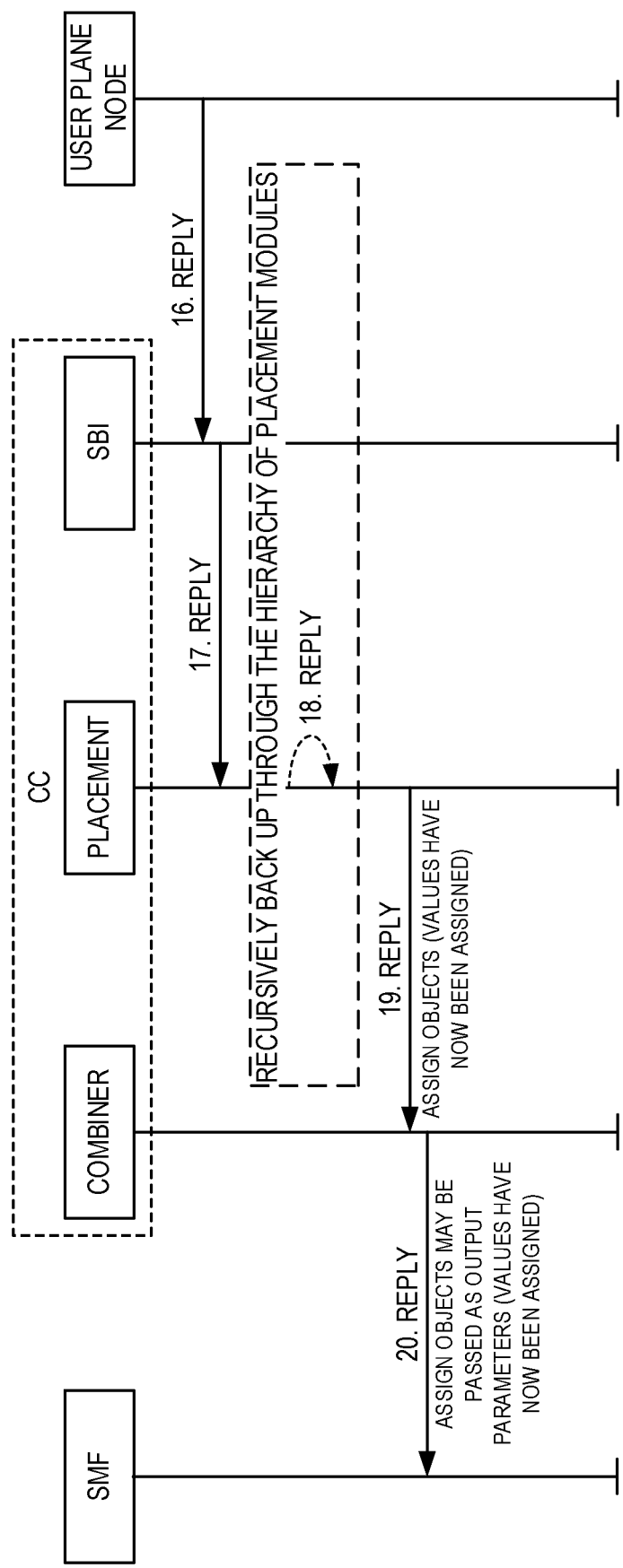

In some embodiments, a method to define and use assign objects is provided. FIGS. 8A through 8C illustrate one example of this method.

Some clarifications to this sequence chart:

Steps 1, 2, 3, 4—A combiner module of the CC receives, from a requesting node, a service description including one or more service template instances. From this and the respective service template definitions, the combiner module generates a service set including μUPF instances, assign objects, and placement associations between μUPF instances and assign objects. The combiner module sends the service set to a placement module of the CC.

Steps 4, 5, 7, 8—The placement module receives the service set and assigns each μUPF instance to a user plane node. Given the associations between μUPF instances and assign objects, each assign object has now implicitly been associated with a user plane node. The placement module sends each assign object instance to the SBI translator module of the CC that is responsible for handling the user plane node. As placement may be recursive, in step 7, the service subset can be sent to a placement module lower in the hierarchy.

Step 6—If the placement module splits the service set into multiple user plane nodes, the placement module adds new assign objects and entry/exit μUPF instances into the service subsets and defines a placement association between each assign object and μUPF instance.

In the uplink direction, the placement module adds an exit μUPF instance to the first (closer to the radio) user plane node and an entry μUPF and two assign objects to the second (further from the radio) user plane node (i.e., the entry μUPF instance and the assign objects are associated). For example, the first assign object has type IPv4 and pool name upnode_ipv4, while the second assign object, e.g., has type uint32 and pool name gtp_teid.

In the downlink direction, the placement module adds an exit μUPF instance to the second (further) user plane node and an entry μUPF instance and an assign object to the first (closer) user plane node. This assumes General Packet Radio Service Tunneling Protocol (GTP) tunneling between user plane nodes. This requires both IP address and TEID, so two assign objects. The concept works just as well with other types of encapsulation. These other types of encapsulation may need any number of one or more assign objects. In other words, there may be different numbers of assign objects depending on the particular implementation.

Steps 9, 10—The SBI translator module assigns a value to the assign object and returns that value to the placement module in the reply to the placement module.

Steps 11, 14—The placement module replaces unassigned μUPF instance parameter values with the relevant assign object values. If replacements have been made, the placement module informs the SBI translator module (step 14). Note that steps 12 and 13 may happen recursively as there may be a hierarchy of placement modules.

Steps 19, 20—The placement module provides the values of the assign objects to the combiner module. The combiner module may provide the values of the assign objects to the requesting node.

Solution 2 (Solution for Problem 2)

In some embodiments, an extension of an SMF is provided to support the very flexible way of requesting user plane services as described herein.

Above, Problem 2 is described from a Fifth Generation (5G) core perspective, where the solution becomes an extension to the SMF. In general, a function that sends a service description to the CC is needed. This may be the SMF, but it may just as well be another function. Furthermore, the problem and the solution apply just as well to Evolved Packet Core (EPC). In that case, the Mobility Management Entity (MME) (plain EPC) or the Serving Gateway—Control Plane (SGW-C)/Packet Data Network Gateway—Control Plane (PGW-C) (EPC-Control and User Plane Separation of EPC Nodes (CUPS)) take the role of that function. Thus, the function requesting the service to the CC is denoted using the generic name "service requester."

In this solution, embodiments are described for providing a very flexible way for a service requester to request user plane services in a system in which the UPFs are decomposed into multiple μUPFs, as described herein.

The decomposed UPF combined with the CC provides a means to establish and maintain user plane services in a very flexible way. A control plane function instructs the CC which service to setup by means of a service description. As described below, the control plane function decides which service template instances to include in the service description, how to set input parameters in each service template instance, and how to deal with output parameters from these service template instances.

Instantiating a Service Description:

The service requester can request a new service from the CC by sending a service description with one or more service template instances, or it can request to update an existing service description. An update request may come at any time after the initial request, and may aim to add or remove a service template instance, or modify one or more parameters in a service template instance.

As an example, Backus-Naur Form (BNF) notation is used to describe the information exchanged between the service requester and the CC. A message has the following content model:

<message>::=<service description ID>[<Initial service description>|<Add service templates>|<Remove service templates>|<Modify input parameters>]
<Initial service description>::="ST" "init" <service templates>
<Add service templates>::="ST" "add" <service templates>
<Remove service templates>::="ST" "remove" <service templates>
<Modify input parameters>::="ST" "modify" [service template pairs>]

There are multiple messages used to manipulate service descriptions. The following message types are defined: 1) an initial service description message that is used when a new service description is added to the system, 2) an add service templates message that is used when the service requester wants to add one or more service templates to an existing service description, 3) a remove service templates message that is used when the service requester wants to remove one or more service templates from an existing service description, and 4) a modify input parameters message that is used when the service requester wants to change one or more input parameters of one or more service templates in an existing service description. Here, service templates are provided in pair; first the old service template, then the new service.

The service description ID is a unique ID for this service. When manipulating a service description, the same ID is used as in the initial request. The service description ID correlates to a "user." The concept is generic and what a user exactly is does not need to be defined in detail. But a user may be, for example, a User Equipment device (UE) or an end-device containing multiple UEs, or an end-user device in a fixed network. A user may also be more abstract, like a multicast service in a virtual Broadband Network Gateway (vBNG).

Service templates optionally contain one or more input parameters, each with a name and a value. The encoding of the service templates is the following:

```
<service templates> ::= <service template> [ ";" <service templates> ]
<service template pairs> ::= <service template pair> [ ";" <service template pairs> ]
<service template pair> ::= <service template> "->" <service template>
<service template> ::= <IDENTIFIER> "(" [<parameters>] ")"
<parameters> ::= <parameter> [ "," <parameters> ]
< parameter> ::= <IDENTIFIER> "=" <value>
```

Further Examples on Service Descriptions:

The CC has access to the full "code" of each service template. The service requester on the other hand only needs to understand the "header" of the service template. In the simplest form, the service requester sends a service description containing only a single header with filled-in parameters. A header with filled-in parameters is called a service template instance herein. An example is given below. The parameters ". . ." would in a real implementation be filled in with, e.g., the description of the flow, a Quality of Service (QoS) profile, etc.

flow(imsi=1234, session_id=1, flow id=1, . . . )

A service description may include multiple service template instances. For example, requesting three flows, where two flows are within the same session:

flow(imsi=1234, session_id=1, flow_id=1, . . . )
    flow(imsi=1234, session_id=1, flow_id=2, . . . )
    flow(imsi=1234, session_id=2, flow_id=1, . . . )

Note that it is up to the internals of the CC to combine these instances into a collection of μUPFs for the user. These internals are not exposed to the service requester.

A service description may contain instances of different service templates. Assume there is a first service template "session" and a second service template "voice-session." The former establishes an ordinary Protocol Data Unit (PDU) session for a UE and the latter establishes a special PDU session tailored for voice traffic. That template may include μUPFs like voice encoding or QoS setting that are not needed in an ordinary PDU session. In the following example the service description includes two ordinary sessions and an additional voice session:

session(id=1, mbr=100 Mbps)
    session(id=2, mbr=100 Mbps)
    voice-session(id=3, mbr=1 Mbps)

A service template may also build upon (inherit) another service template. This would be visible in the header of the service template. In the following example the service template "break-out-session" inherits from "session."

service template session(key uint64 id);
    service template break-out-session(key uint64 id, key string dst_ip): session(id);

In the service description, establishing a first session is specified, and then breaking-out a part of that session's traffic. The break-out traffic is denoted by the uplink destination IP address. The functionality is similar to adding a local PDU session anchor and uplink classifier as defined in 3GPP Technical Specification (TS) 23.502.

session(id=1)
    break-out-session(id=1, dst_ip="1.2.3.4")

An important aspect of the service description for a user is that it may change over time. In the example above, the first and second session may be instantiated when the UE attaches. But the voice session is not initiated until the voice call starts. The break-out session example is similar. The break-out does not need to be part of the initial request.

Over time, parameters of the service template instances may change. One example is mobility. The session service template may contain additional parameters like TEID and IP of the base station currently serving this UE. When the UE moves to another base station these parameters will change.

Deciding What to Include in the Service Description:

Here, methods are disclosed for enabling the service requester to decide what to include in the service description that is sent to the CC.

In the simplest form, the user gets a "static" service description at some point in time. This service description does not change later. This would be the case when the user is represented by a device that does not move and that this not require a change in its user plane service. Examples of such devices are robots or other devices in a factory automation setting. The service may be initiated when the device attaches to the network.

In a bit more advanced form, the service description would change over time. Applying this to the 5G core, the resulting sequence chart would be as that illustrated in FIGS. 9A through 9C. This chart is based on the procedures defined in the specification 3GPP TS 23.501.

Figure 9A:
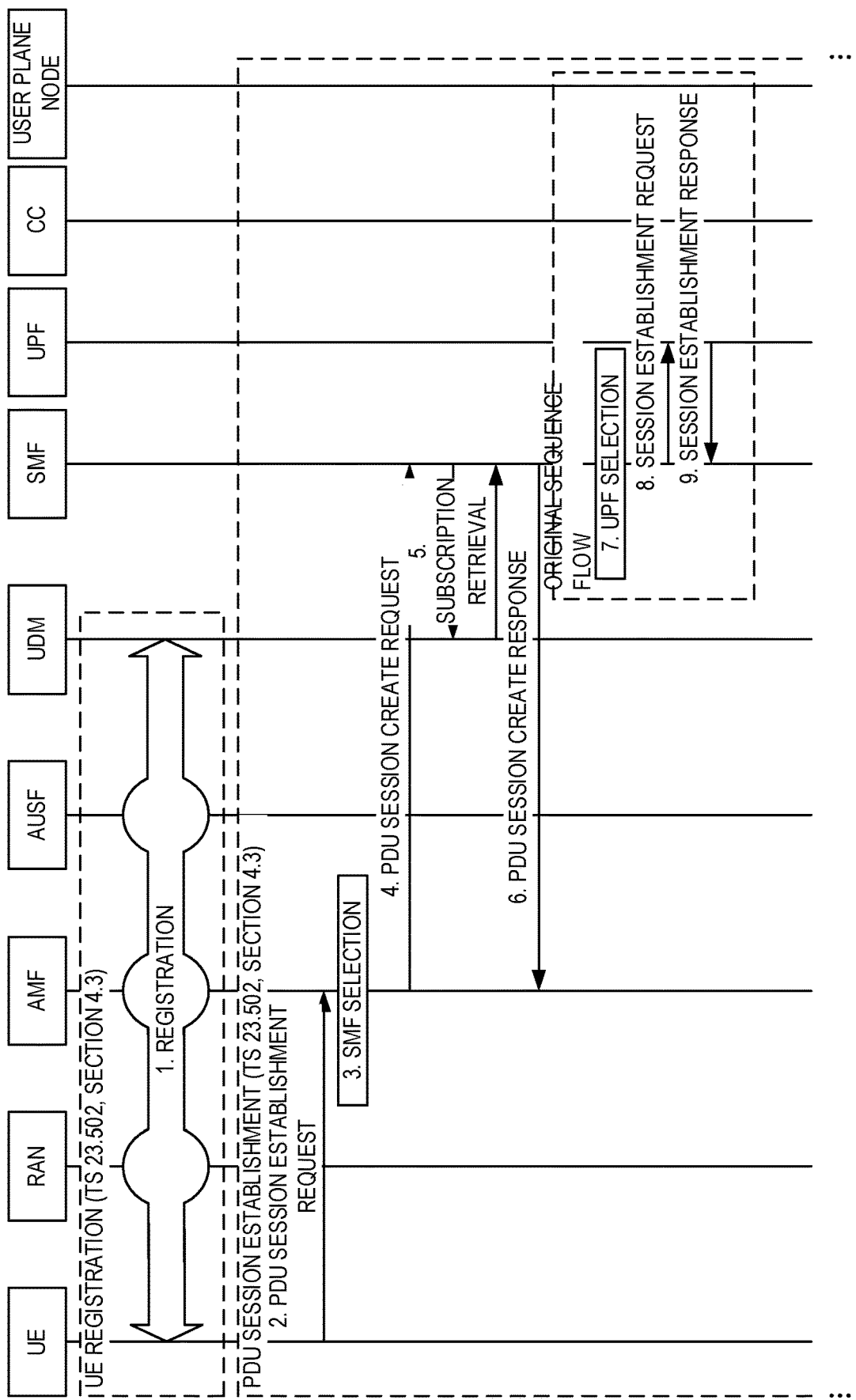
FIGS. 9A through 9C illustrate an example process in which a service description changes over time in accordance with some embodiments of the present disclosure.
Figure 9B:
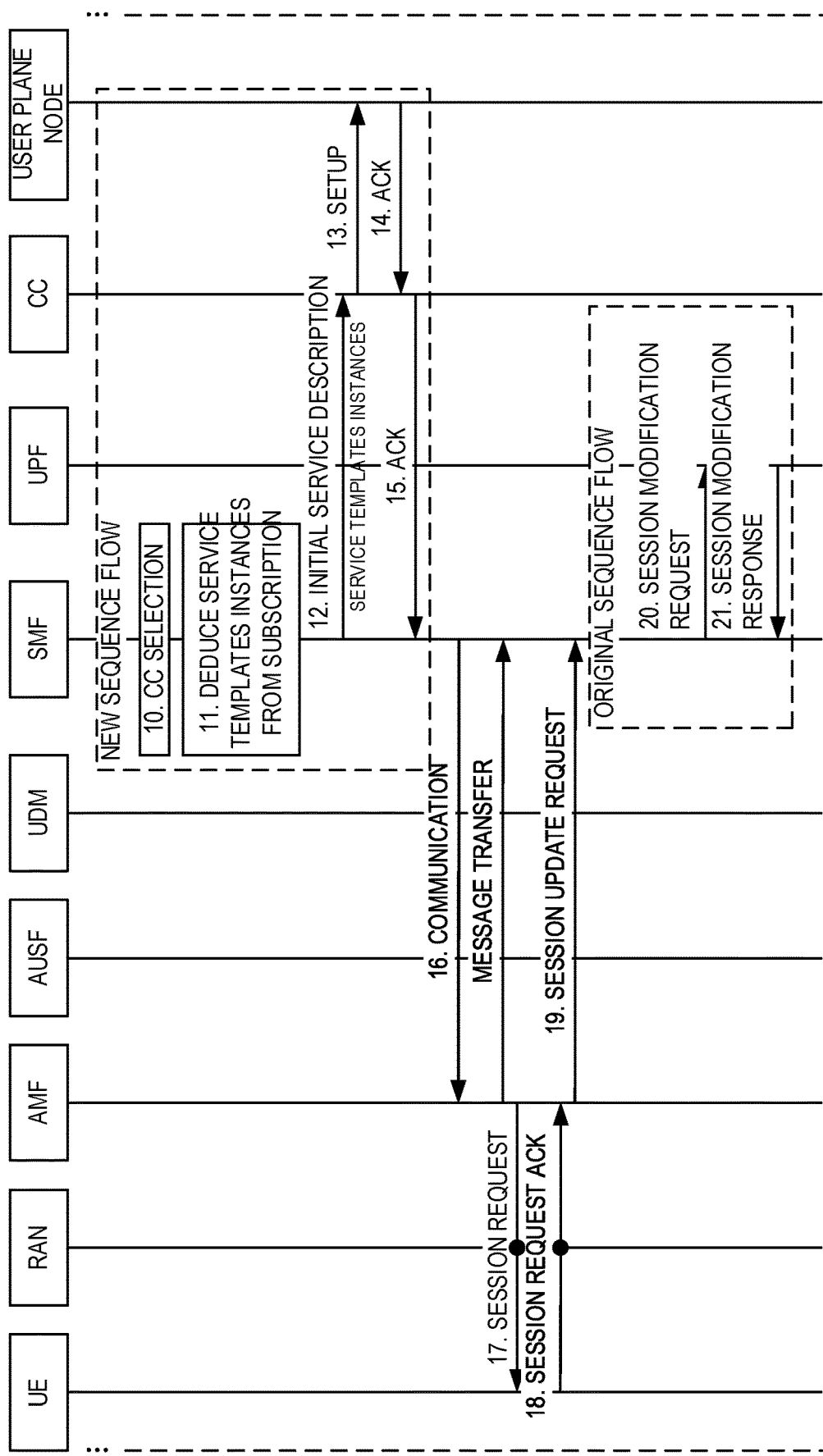
Figure 9C:
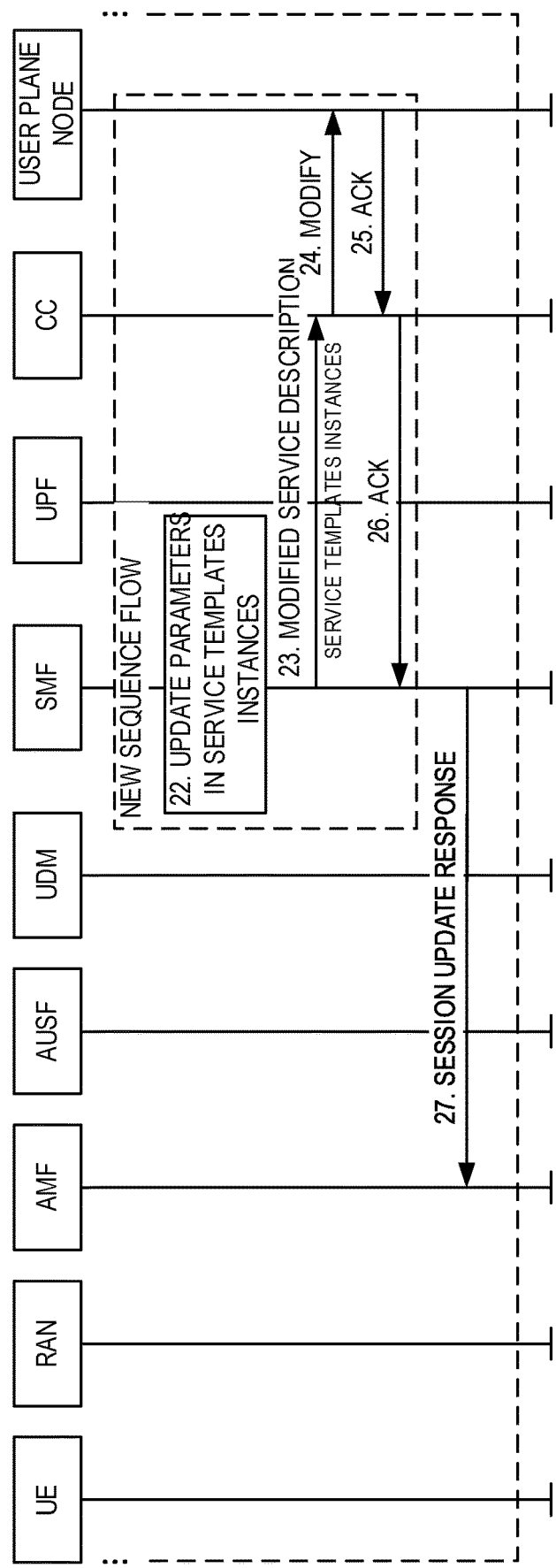

Referring to FIGS. 9A through 9C, the new steps are 10-15 (replacing steps 7-9) and 22-26 (replacing steps 20-21). Note that the ordering of steps in any of the figures described herein may be performed in any desired order unless explicitly stated or otherwise required. As an example, the order of steps 10 and 11 here is irrelevant such that steps 10 and 11 can be performed in any order.

The important steps for this solution are numbers 11 and 22. In this example, the service templates to use for this UE are stored in the user's profile in the Unified Data Management (UDM). The service template instances are retrieved in step 5. The values for the service template header parameters may also be stored in the same user profile. This information is used to build the service description, which is then sent in step 12. Other parameter values may be mapped from information of incoming events. For example, for downlink user plane traffic, the UPF needs to know which Radio Access Network (RAN) node to send to. This information is not sent to the Authentication Management Function (AMF) until step 18. Therefore, steps 19 and 20 are needed to inform the UPF. In the present disclosure this is implemented as a modification to the service description (step 23). The RAN node is a parameter given in the event of step 19. In step 22 that parameter is mapped to the correct parameter of the correct service template header. The mapping "value of event parameter x→value of service template y's parameter z" may again be stored in the UDM (and retrieved at step 5), or may be hardcoded in the Session Management Function (SMF).

At a later point in time the UE or some control plane entity may trigger other events. For example, the UE may request an additional PDU session, possibly with another Session and Service Continuity (SSC) mode. This would result in yet another service description modification. The initial PDU session may get mapped to a service template "session" (see previous section), whereas the additional PDU session may get mapped to a service template "break-out-session" or "voice-session."

As explained above, the service description can also change, e.g., when performing handovers. The service template instance parameters may contain the IP address of the base station and the TEID to use for downlink packets. A call flow is presented in FIG. 10 to exemplify this.

Figure 10:
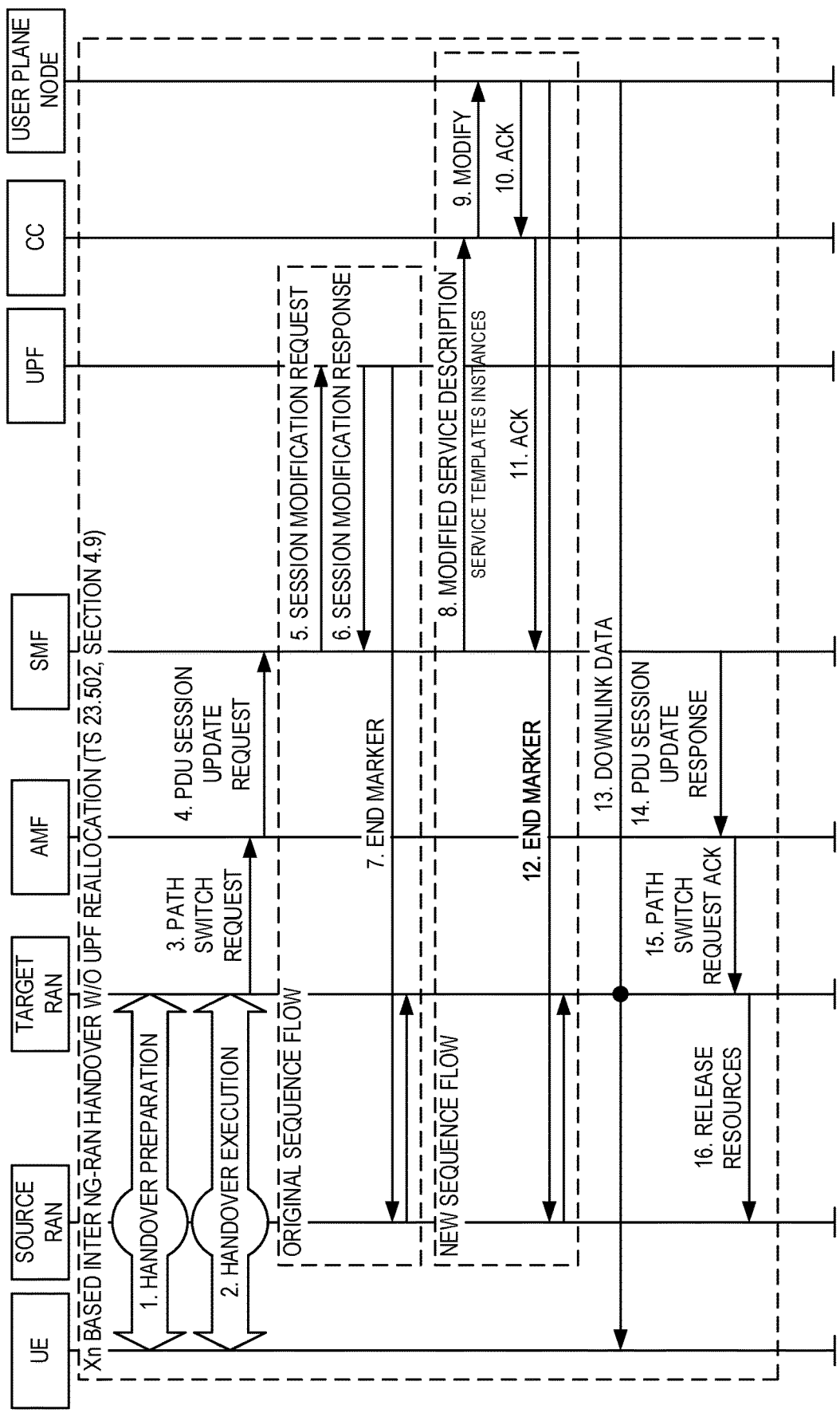
FIG. 10 illustrates a process in which the service description changes, e.g., when performing handovers in accordance with some embodiments of the present disclosure.

Referring to FIG. 10, the new steps here are 8-11, where the SMF is triggered by a PDU Session Update Request to modify the service description.

The ideas above may just as well be applied to other systems like EPC or a fixed network. In more abstract terms the novelty is the following: an event for a user is mapped to a modification of the service description. The modification can take the form of adding one or more service templates, removing one or more service templates, or changing one or more service template parameter values. The mapping is stored in a database external or internal to the service requester.

With this approach, every individual user can get an individual service description. It is also possible to group users. For example, all users within a core network slice use the same mapping. Or, all devices of the same type use the same mapping.

Dealing with Output Parameters:

Service template definitions (and thus service template instances) may have output parameters. Mapping of output parameters can be done in a similar way as mapping input parameters. Output parameters may be mapped to information elements used in the reply of the event.

Following the example of the 5G core above, it is the SMF that assigns the IPv4 address of a PDU session. That IPv4 address is sent to the UE via steps 16 and 17 of FIGS. 9A through 9C. In the present disclosure, if the CC would assign the IP address for the session, then that would be performed after receiving step 12, and sent back to the SMF as part of step 15 (again referring to FIGS. 9A through 9C). In the mapping, the IP address information elements as output parameter in step 15 would get translated to an information element for the message of step 16 (again referring to FIGS. 9A through 9C).

Solution 3 (Solution for Problem 3)

In this solution, systems and methods are disclosed herein for providing SBI functionality for a CC. In some embodiments, a service set is taken as input and used to produce a service chain graph including one or more branches. A service set is a list of μUPFs that are to be instantiated on one or more user plane nodes.

Service Set:

A service set includes a list of μUPF instances, where each instance has a unique name. Each μUPF has a role, which can be entry processing, exit processing, or normal. If a μUPF has an entry processing or exit processing role, it should be explicitly stated. Each non-entry μUPF has at least one flow (see next section).

The service set may also include ordering constraints between μUPF instances. A constraint "a before b" means that packets that shall pass both μUPF instance a and μUPF instance b, shall first go through a before going through b.

A special μUPF name is "drop." All packets coming in to such μUPF will be dropped.

Definition of a Flow:

A μUPF has conceptually a single input port and one or more output ports. An example of a μUPF with multiple output ports is a classifier.

As an example, a classifier UPF has two input parameters, a start_range IP address and an end_range IP address. If the destination IP address in the packet is within the range defined by start_range and end_range, the classifier emits the packet on outgoing port 1; otherwise it emits it on outgoing port 0.

The type definition of this classifier (in the service template definition language) is the following:
　　upftype multiport(2) Classifier(uint32 start_range, uint32 end_range)

Entry processing is always the first μUPF to be executed in the user plane, while exit processing is always the last. There is at least one entry processing μUPF for uplink, and at least one for downlink. Similarly, there is at least one exit processing for uplink and at least one for downlink. Entry processing μUPFs do a match on certain values in the packet header (e.g., TEID) and associate the packet implicitly with a flow.

The type definition (on the P1 interface) of an example entry processing μUPF is the following:
　　entry upftype BS_Entry(uint32 match_teid);

Similarly, a type definition (on the P1 interface) of an example exit processing μUPF is the following:
　　exit upftype BS_Entry(uint32 encaps_teid, uint32 encaps_ipv4);

A flow is a description of the traffic that has to pass the μUPF instance.

A non-entry μUPF instance has at least one flow association, whereas an entry μUPF instance has no flow association. A flow consists of an entry μUPF and optionally one or more filters. A filter is defined by a μUPF instance name and its output port value.

In the simplest form, a μUPF instance has a single entry μUPF in its flow clause (and an empty filter). This means that the traffic that passes the given entry μUPF instance will pass this μUPF instance, too. In the following example, BS#1 is an entry μUPF instance. The bwlimit#1 μUPF instance looks like this in the service set (e.g., placement-SBI translator interface).
　　upf uplink bwlimit#1=BWLimit(limit=10),
　　　　use flow bs#1;

A μUPF instance can have multiple flows and, in the simplest form, each flow contains a single entry μUPF (and an empty filter). The semantics is that traffic from the first entry μUPF instance or traffic from the second entry μUPF instance will pass this μUPF instance. In the following example, bs#1 and bs#2 are entry μUPF instances.
　　upf uplink bwlimit#1 =BWLimit(limit=10),
　　　　use flow bs#1,
　　　　use flow bs#2;

As defined above, a flow can have a non-empty filter. If not empty, the filter contains μUPF instance name and outgoing port value pairs. The filters give additional requirements on the traffic that passes through the given μUPF instance. The traffic to pass through the given μUPF instance has to originate from the entry μUPF instance from the flow description and has to pass the μUPF instance specified in the filter, and it has to be emitted on the outgoing port specified in the filter. Note that this also implies that there is an ordering constraint so that the classifier comes before the μUPF instance (this ordering constraint is added to the service set by the placement module).
　　upf uplink high-touch-upf#1=HightTouchUPF( )
　　　　use flow bs#1, cl#1==1;

Note that if a μUPF instance does not have a classifier μUPF instance in its filter, the classifier μUPF instance may be still passed before this specific μUPF, but there is no requirement on the outgoing port value. In other words, the μUPF instance will be passed for all outgoing port values. However, it may also happen that this μUPF instance will be passed first and the classifier μUPF only later. This effect is driven by the ordering constraints.

Summarizing, a μUPF instance can have multiple flow clauses. There is an OR relationship between the multiple flow clauses. The traffic that passes through the μUPF instance has to match (go through) flow_1 OR flow_2 OR flow_n. However, there is an AND relationship between the individual elements in a flow.

Assume that flow_1 is defined as entry1, cl_1=value_1, . . . , cl_k=value k, while flow_n is defined as entry_n, cl_n=value n, . . . , cl_l=value_l, upf uplink exampleupf#1=ExampleUPF( )
        use flow entry_1, cl1==value_1, . . . , cl_k==value_k;
        . . .
        use flow entry_n, cl_n==value_n, . . . , cl_l==value_l;

Then, the traffic that passes through this μUPF instance (has to originate from entry_1, AND going through the outgoing port value_1 of cl_1 AND . . . AND the outgoing port value_k of cl_k) OR (. . . ) OR (has to originate from entry_n, AND going through the outgoing port value_n of cl_n AND . . . AND the outgoing port value_k of cl_k).

Definition of a Service Chain Graph:

The service chain graph consists of branches. A branch is defined as a set of edges. An edge has the following format: (current_branch, source_upf_instance, source_upf_outgoing_port, target_upf_instance, target_branch). The semantics is the following: this edge is part of current_branch, and it describes the effect that if the packet is processed in source_upf_instance and is emitted on source_upf_outgoing_port, it will be processed next in target_upf_instance and the next edge is in target_branch.

Figure 11:
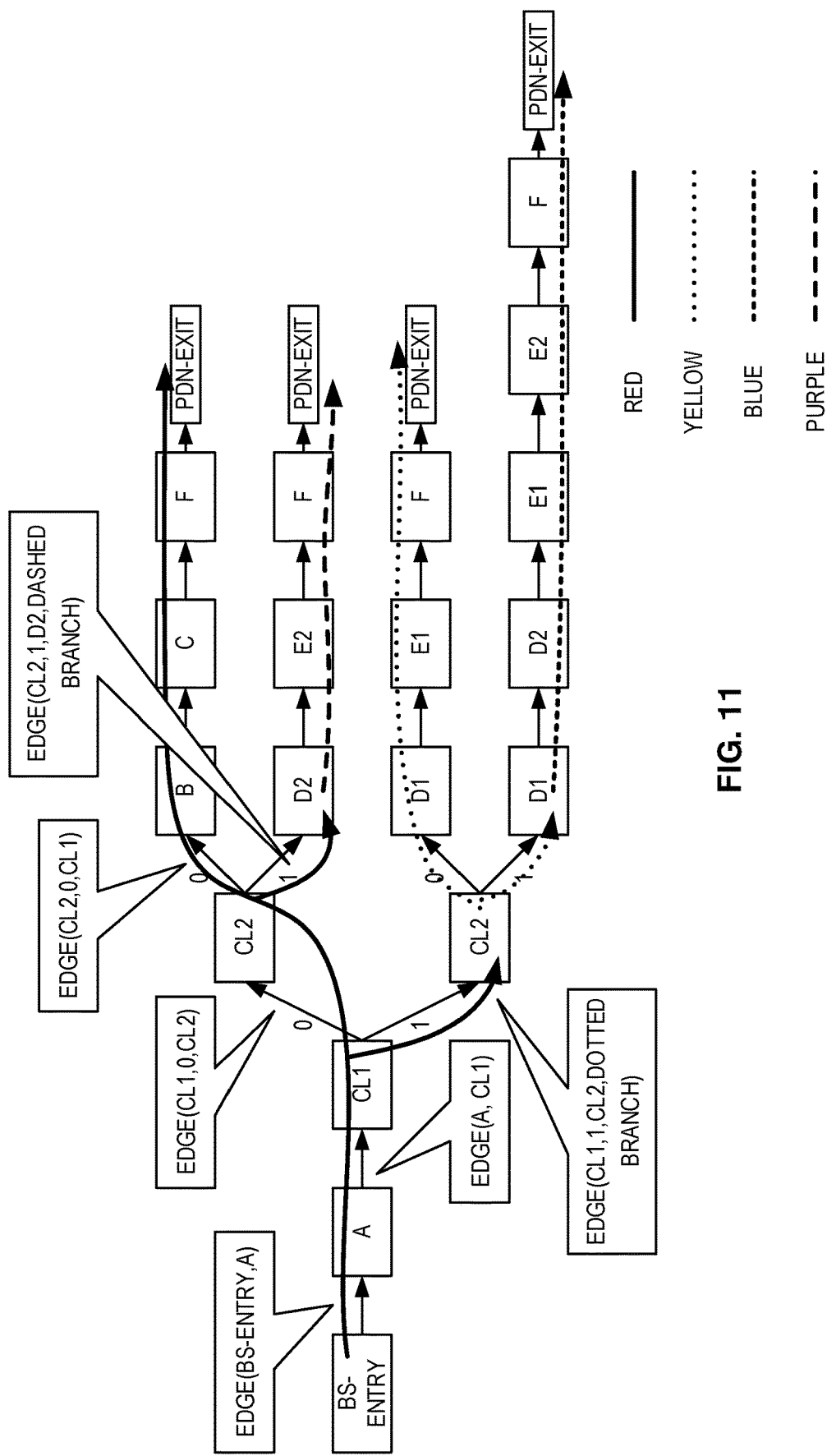
FIG. 11 illustrates an example of a service chain graph and the entry of a packet into the service graph and the propagation of the packet along the edges of the service chain graph in accordance with some embodiments of the present disclosure.

The packet always enters the graph in an entry μUPF. Then, it follows edges until finally it is processed in an exit μUPF. An example is shown in FIG. 11. As illustrated in FIG. 11, there are four branches in the example, all marked with different colors: red, purple, yellow, and blue. All the edges of the red branch are shown in FIG. 11. If the outgoing port number is not given, it means that the μUPF has a single outgoing port (which has the default value 0). If the target branch is not given, it means that it is the same as the source branch.

As an example, the red branch has the following edges (with all the information filled in):

(red branch, BS-Entry, 0, A, red branch)
    (red branch, A, 0, CL1, red branch)
    (red branch, CL1, 0, CL2, red branch)
    (red branch, CL1, 1, CL2, yellow branch)
    (red branch, CL2, 0, B, red branch)
    (red branch, CL2, 1, D, purple branch)
    (red branch, B, 0, C, red branch)
    (red branch, C, 0, F, red branch)
    (red branch, F, 0, PDN-Exit, red branch)

SBI Translator Module Operation:

The following three steps are performed by the SBI translator module:

- The SBI translator receives a service set from the placement module (at the placement-SBI translator interface). The service set includes UPF instances with their flow clauses and ordering constraints between the UPF instances.
- The SBI translator uses the flow clauses of the UPF instances and the ordering constraints to calculate a service chain graph (i.e., the set of edges).
- The SBI translator sends the calculated edges to the user plane node. This can happen via multiple protocol formats.

Regarding the second step, the edges of the service chain graph are determined as follows:

1) For each entry μUPF instance, collect all other μUPF instances that have at least one flow clause that refers to that entry μUPF instance.
2) Make a sorted list of each collection of μUPF instances complying with the ordering constraints, keeping only the flow clauses for that μUPF entry. (This sorted list starts with the entry μUPF).
3) For each list, call the function create_branches(upf_list, starting_branch, { }), where starting_branch is set to 0 at the first call, or the return value of the previous call+1.

The create_branches function is implemented or performed by the SBI translator module. The create_branches function receives an ordered list of μUPF instances, and it creates all the branches that it finds in the list. The ID of the current branch is also given as an input parameter. The origin_filter_expression is a list with μUPF instance names and output port values, and it contains information known about the branch so far. The subsequent branches will have the branch ID incremented accordingly. Finally, the function returns the ID of the latest branch created.

The details of the create_branches function, in accordance with one example are as follows:

```
create_branches(upf_list, origin_branch_id, origin_filter_expression) {
    1. UPF#1 is the first item in upf_list. Remove that item from upf_list.
    2. Let latest_branch_id=origin_branch_id
    3. For i=0 to (number of UPF#1 ports − 1) {
        3a) Let current_filter_expression=origin_filter_expression.
        3b) If UPF#1 is multiport, append "UPF#1==i" to current_filter_expression.
        3c) Find UPF#2, which is the first item in upf_list that has a flow clause matching
        current_filter_expression. A match means that there is no filter sub-expression in the flow
        clause that contradicts a filter sub-expression of current_filter_expression. Two filter sub-
        expressions a==x contradict when $a_1=a_2$ and $x_1!=x_2$.
        3d) If a UPF#2 is found, and UPF#2 is not named "drop", then perform the following steps 3e-
        3f-:
        3e) Create an edge for origin_branch_id from UPF#1 to UPF#2 with UPF#1 output value i if
        multiport. If i>0 the target branch for the edge is ++latest_branch_id, otherwise the target
        branch is latest_branch_id. The created edge is the following: (origin_branch_id, UPF#1, i,
        UPF#2, target_branch)
        3f) Call latest_branch_id = create_branches(upf_list starting from UPF#2, latest_branch_id,
        current_filter_expression)
    }
    4. return latest_branch_id
}
```

A new edge is created every time step 3e is executed. One aspect is finding the next µUPF (µUPF #2) after µUPF #1 (selected at step 1). Here we have to find another µUPF from the same list.

EXAMPLES

Example 1

Service Set: An example service set (but only the µUPF instances and the ordering constraints) is shown below:
upf uplink entry bs#(100,10,1,ul)=BS_Entry( )
upf uplink bwlimit#(100,ul)=BWLimit(limit=10),
  use flow bs#(100,10,1,ul);
upf uplink dscpsetting#(100,10,1,ul)=DSCPSetting (dscp=0),
  use flow bs#(100,10,1,ul);
upf uplink charging#(100,10,ul)=Charging( )
  use flow bs#(100,10,1,ul);
upf uplink exit pdn#(100,10,1)=PDN_Exit( )
  use flow bs#(100,10,1,ul);
order bs#(100,10,1,ul) before bwlimit#(100,ul);
order bwlimit#(100,ul) before dscpsetting#(100,10,1,ul);
order bwlimit#(100,ul) before charging#(100,10,ul);
upf downlink entry pdn#(100,10,1,dl)=PDN_Entry(dst_ip=100.100.100.100),
  upf downlink dscpsetting#(100,10,1,dl)=DSCPSetting (dscp=0),
  use flow pdn#(100,10,1,dl);
upf downlink charging#(100,10,dl)=Charging( )
  use flow pdn#(100,10,1,dl);
upf downlink bwlimit#(100,dl)=BWLimit(limit=100),
  use flow pdn#(100,10,1,dl);
upf downlink exit bs#(100,10,1,dl)=BS_Exit(encaps_teid=50, bs_ip="1.2.3.4"),
  use flow pdn#(100,10,1,dl);
order charging#(100,10,dl) before bwlimit#(100,dl);
order dscpsetting#(10,10,1,dl) before bwlimit#(100,dl);
order bwlimit#(100,dl) before bs#(100,10,1,dl);
  µUPF lists: After inspecting the ordering constraints, the following UPF lists are created:
µUPF list1:
  upf uplink entry bs#(100,10,1,ul)
  upf uplink bwlimit#(100,ul)
  upf uplink dscpsetting#(100,10,1,ul)
  upf uplink charging#(100,10,ul)
  upf uplink pdn#(100,10,1,ul)
µUPF list2:
  upf downlink entry pdn#(100,10,1,dl)
  upf downlink dscpsetting#(100,10,1,dl)
  upf downlink charging#(100,10,dl)
  upf downlink bwlimit#(100,dl)
  upf downlink bs#(100,10,1,dl)
Determined edges as algorithm output: The computed edges are the following:
(branch 0, bs#(100,10,1,ul), port 0, bwlimit#(100,ul), branch 0)
(branch 0, bwlimit#(100,ul), port 0, dscpsetting#(100,10,1,ul), branch 0)
(branch 0, dscpsetting#(100,10,1,ul), port 0, charging#(100,10,ul), branch 0)
(branch 0, charging#(100,10,ul), port 0, pdn#(100,10,1,ul), branch 0)
(branch 1, pdn#(100,10,1,dl), port 0, dscpsetting#(100,10,1,ul), branch 1)
(branch 1, dscpsetting#(100,10,1,dl), port 0, charging#(100,10,dl), branch 1)
(branch 1, charging#(100,10,dl), port 0, bwlimit#(100,dl), branch 1)
(branch 1, bwlimit#(100,dl), port 0, bs#(100,10,1,dl), branch 0)

Example 2

Service Set: Another example for a service set is shown below. This includes a classifier in the uplink with two parameters (ip_range_start and ip_range_end) and two outgoing ports. The packet is emitted in outgoing port 1 if the destination IP address of the packet is in the range, and on outgoing port 0 otherwise).
upf uplink entry bs#(100,1,ul)=BS_Entry (match_teid=%s1u_teid_ul#(100,1))
upf uplink a#(100,1,ul)=A( )
  use flow bs#(100,1,ul);
upf uplink b#(100,1,ul)=B( )
  use flow bs#(100,1,ul), cl#(100,1,2.0.0.0, 2.255.255.255,ul)==0, cl#(100,1,3.0.0.0, 3.255.255.255,ul)==0;
upf uplink c#(100,1,ul)=C( )
  use flow bs#(100,1,ul), cl#(100,1,2.0.0.0, 2.255.255.255,ul)==0, cl#(100,1,3.0.0.0,3.255.255.255,ul)==0;
upf uplink exit pdu#(100,1,ul)=PDU_Exit( )
  use flow bs#(100,1,ul), cl#(100,1,2.0.0.0, 2.255.255.255,ul)==0, cl#(100,1,3.0.0.0,3.255.255.255,ul)==0;
upf uplink cl#(100,1,2.0.0.0,2.255.255.255,ul)=Cl(ip_range_start="2.0.0.0",
ip_range_end="2.255.255.255")
  use flow bs#(100,1,ul), multiport(2);
upf uplink d#(100,1,2.0.0.0,2.255.255.255,ul)=D( )
  use flow bs#(100,1,ul), cl#(100,1,2.0.0.0, 2.255.255.255,ul)==1;
upf uplink e#(100,1,2.0.0.0,2.255.255.255,ul)=E( )
  use flow bs#(100,1,ul), cl#(100,1,2.0.0.0, 2.255.255.255,ul)==1;
upf uplink exit pdu#(100,1,2.0.0.0,2.255.255.255,ul)= PDU_Exit( )
  use flow bs#(100,1,ul), cl#(100,1,2.0.0.0, 2.255.255.255,ul)==1,
upf downlink entry pdu#(100,1,dl)=PDU_TFT_Entry (tft=x)
  use assign ue_ip#(100,1);
upf downlink a#(100,1,dl)=A( )
  use flow pdu#(100,1,dl),
  use flow pdu#(100,1,2.0.0.0, 2.255.255.255,dl);
upf downlink b#(100,1,dl)=B( )
  use flow pdu#(100,1,dl);
upf downlink c#(100,1,dl)=C( )
  use flow pdu#(100,1,dl);
upf downlink exit bs#(100,1,dl)=BS_Exit(encaps_teid=50, bs_ip="1.2.3.4")
  use flow pdu#(100,1,dl),
  use flow pdu#(100,1,2.0.0.0, 2.255.255.255,dl);
upf downlink entry pdu#(100,1,2.0.0.0, 2.255.255.255,dl) =PDU_TFT_Entry(tft=y);
upf downlink d#(100,1,2.0.0.0,2.255.255.255,dl)=D( )
  use flow pdu#(100,1,2.0.0.0, 2.255.255.255,dl);
upf downlink e#(100,1,2.0.0.0,2.255.255.255,dl)=E( )
  use flow pdu#(100,1,2.0.0.0, 2.255.255.255,dl);
order a#(100,1,ul) before b#(100,1,ul)
order a#(100,1,ul) before c#(100,1,ul)
order a#(100,1,ul) before d#(100,1,2.0.0.0,2.255.255.255, ul)

order a#(100,1,ul) before e#(100,1,2.0.0.0,2.255.255.255,ul)
order b#(100,1,dl) before a#(100,1,dl)
order c#(100,1,dl) before a#(100,1,dl)
order d#(100,1,2.0.0.0,2.255.255.255,dl) before a#(100,1,dl)
order e#(100,1,2.0.0.0,2.255.255.255,dl) before a#(100,1,dl)
  μUPF lists: There are three entry μUPF in the service set above, so inspecting the ordering constraints, three μUPF lists are created.
μUPF list 1:
  upf uplink entry bs#(100,1,ul)
  upf uplink cl#(100,1,2.0.0.0,2.255.255.255,ul)
  upf uplink a#(100,1,ul)
  upf uplink b#(100,1,ul)
  upf uplink c#(100,1,ul)
  upf uplink d#(100,1,2.0.0.0,2.255.255.255,dl)
  upf uplink e#(100,1,2.0.0.0,2.255.255.255,dl)
  upf uplink exit pdu#(100,1,ul)
μUPF list 2: (downlink)
  upf downlink entry pdu#(100,1,dl)
  upf downlink c#(100,1,dl)
  upf downlink b#(100,1,dl)
  upf downlink a#(100,1,dl)
  upf downlink exit bs_exit#(100,1,dl)
μUPF list 3: (downlink)
  upf downlink entry pdu#(100,1,2.0.0.0, 2.255.255.255,dl)
  upf downlink e#(100,1,2.0.0.0,2.255.255.255,dl)
  upf downlink d#(100,1,2.0.0.0,2.255.255.255,dl)
  upf downlink a#(100,1,dl)
  upf downlink exit bs_exit#(100,1,dl)
    Determined edges: In total, four branches are created, two in the uplink direction and two in the downlink direction. The downlink branches are straightforward, as there are no classifiers in the downlink direction. The two uplink branches are the following:
Branch 0:
  (branch 0, bs#(100,1,ul), port 0, cl#(100,1,2.0.0.0, 2.255.255.255,ul), branch 0)
  (branch 0, cl#(100,1,2.0.0.0,2.255.255.255,ul), port 0, a#(100,1,ul), branch 0)
  (branch 0, a#(100,1,ul), port 0, b#(100,1,ul), branch 0)
  (branch 0, b#(100,1,ul), port 0, c#(100,1,ul), branch 0)
  (branch 0, c#(100,1,ul), port 0, pdu#(100,1,ul), branch 0)
  (branch 0, cl#(100,1,2.0.0.0,2.255.255.255,ul), port 1, a#(100,1,ul), branch 1)
Branch 1:
  (branch 1, a#(100,1,ul), port 0, d#(100,1,2.0.0.0, 2.255.255.255,dl), branch 1)
  (branch 1, d#(100,1,2.0.0.0,2.255.255.255,dl), port 0, e#(100,1,2.0.0.0,2.255.255.255,dl), branch 1)
  (branch 1, e#(100,1,2.0.0.0,2.255.255.255,dl), port 0, pdu#(100,1,ul), branch 1)

Example System Implementing Aspects of the Present Disclosure

Figure 12:
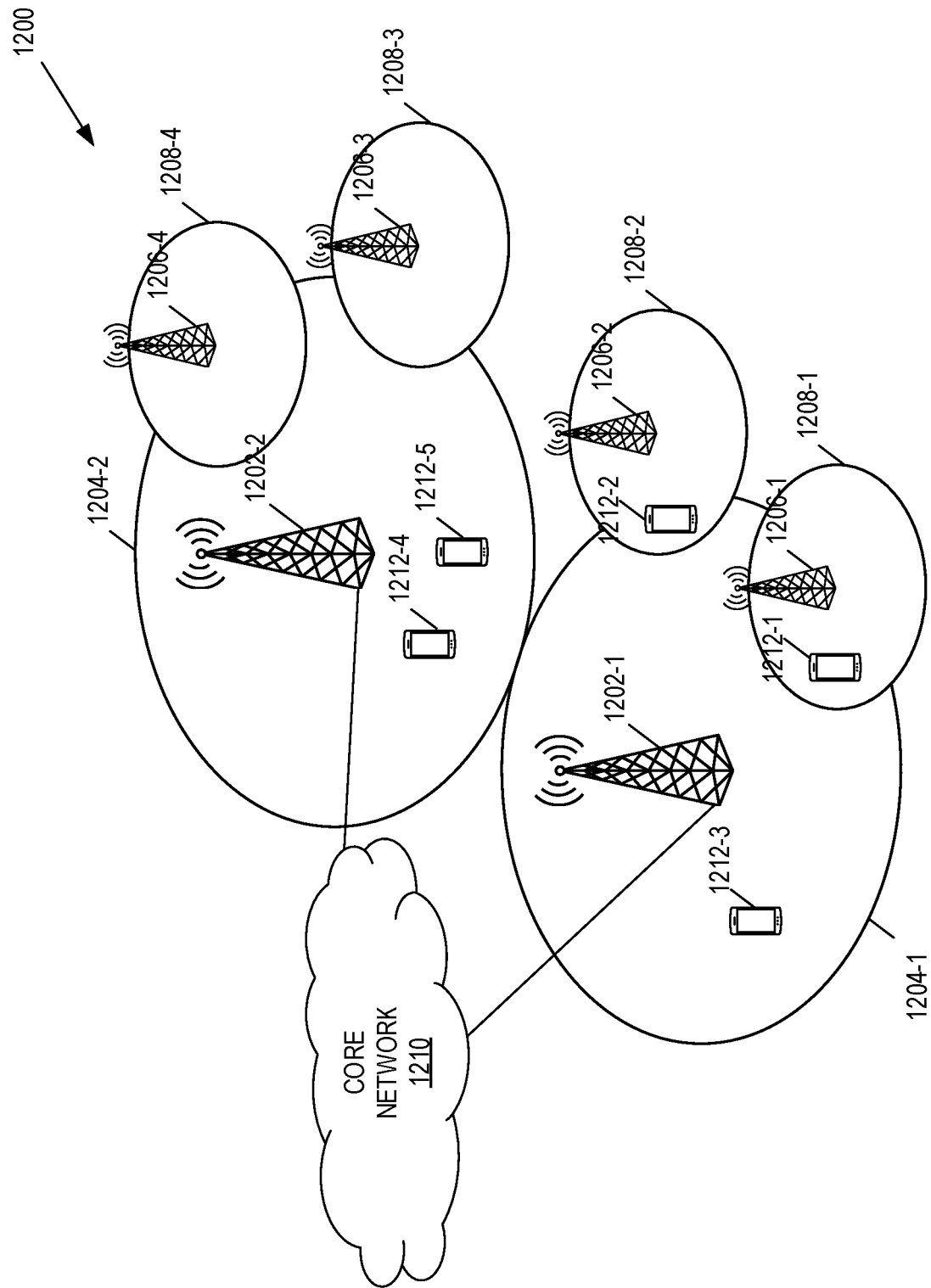
FIG. 12 illustrates one example of a cellular communications network in which embodiments of the present disclosure may be implemented.

FIG. 12 illustrates one example of a cellular communications network 1200 in which embodiments of the present disclosure may be implemented. In the embodiments described herein, the cellular communications network 1200 is a 5G New Radio (NR) network. However, the present disclosure is not limited thereto. In this example, the cellular communications network 1200 includes base stations 1202-1 and 1202-2, which in LTE are referred to as enhanced or evolved Node Bs (eNBs) and in 5G NR are referred to as NR base stations (gNBs), controlling corresponding macro cells 1204-1 and 1204-2. The base stations 1202-1 and 1202-2 are generally referred to herein collectively as base stations 1202 and individually as base station 1202. Likewise, the macro cells 1204-1 and 1204-2 are generally referred to herein collectively as macro cells 1204 and individually as macro cell 1204. The cellular communications network 1200 may also include a number of low power nodes 1206-1 through 1206-4 controlling corresponding small cells 1208-1 through 1208-4. The low power nodes 1206-1 through 1206-4 can be small base stations (such as pico or femto base stations) or Remote Radio Heads (RRHs), or the like. Notably, while not illustrated, one or more of the small cells 1208-1 through 1208-4 may alternatively be provided by the base stations 1202. The low power nodes 1206-1 through 1206-4 are generally referred to herein collectively as low power nodes 1206 and individually as low power node 1206. Likewise, the small cells 1208-1 through 1208-4 are generally referred to herein collectively as small cells 1208 and individually as small cell 1208. The base stations 1202 (and optionally the low power nodes 1206) are connected to a core network 1210.

The base stations 1202 and the low power nodes 1206 provide service to wireless devices 1212-1 through 1212-5 in the corresponding cells 1204 and 1208. The wireless devices 1212-1 through 1212-5 are generally referred to herein collectively as wireless devices 1212 and individually as wireless device 1212. The wireless devices 1212 are also sometimes referred to herein as UEs.

In some embodiments, embodiments of the present disclosure are implemented in the core network 1210. More specifically, at least some of the user plane functions in the core network 1210 are decomposed into μUPFs as described above. Further, the core network 1210 includes a CC that operates as described above. However, in some embodiments, the virtual RAN can be decomposed into μUPFs. In other words, the concepts described herein are equally applicable to both the RAN and the core network (i.e., the concepts described herein are applicable to any type of network, where the core network and the RAN are two examples).

As used herein, a "network node" is : (a) a physical (infrastructure) network node (e.g., a physical network node implementing a network function(s) (e.g., a 5G Core Network (5GC) network function such as a CC, service requester, SMF, and/or the like)) as, e.g., a virtual machine(s) or a physical network node operating to provide the functionality of a network function(s) or (b) a virtual network node (e.g., a virtual machine that provides the functionality of a network function(s)) and operates on a physical network node(s). One example of a network node is a user plane node in which one or more μUPFs are implemented. The μUPFs may be implemented, e.g., in software (e.g., using virtualization techniques). The user plane node is, for example, a physical network node or a virtual network node, depending on the particular embodiment. Another example of a network node is a network node in which a CC is implemented in accordance with any of the embodiments described herein.

Figure 13:
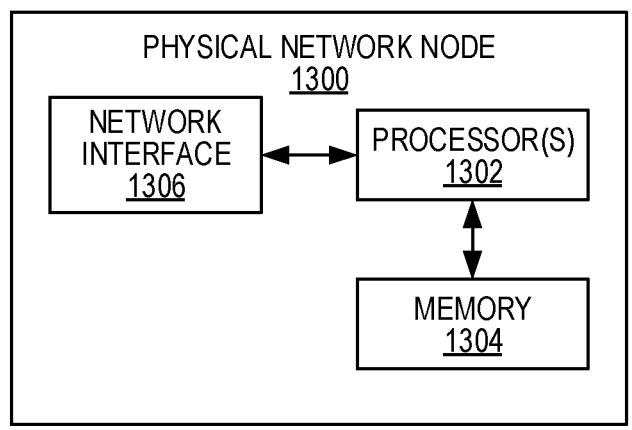
FIG. 13 is a schematic block diagram of a physical network node that implements a CC or one or more μUPFs according to some embodiments of the present disclosure.

FIG. 13 is a schematic block diagram of a physical network node 1300 that implements a chain controller or one or more μUPFs according to some embodiments of the present disclosure. The physical network node 1300 includes one or more processors 1302 (e.g., Central Processing Units (CPUs), Application Specific Integrated Circuits (ASICs), Field Programmable Gate Arrays (FPGAs), and/or the like), memory 1304, and a network interface 1306. The one or more processors 1302 operate to provide one or more functions of a network node as described herein. In some embodiments, the function(s) are implemented in software that is stored, e.g., in the memory 1304 and executed by the one or more processors 1302.

Figure 14:
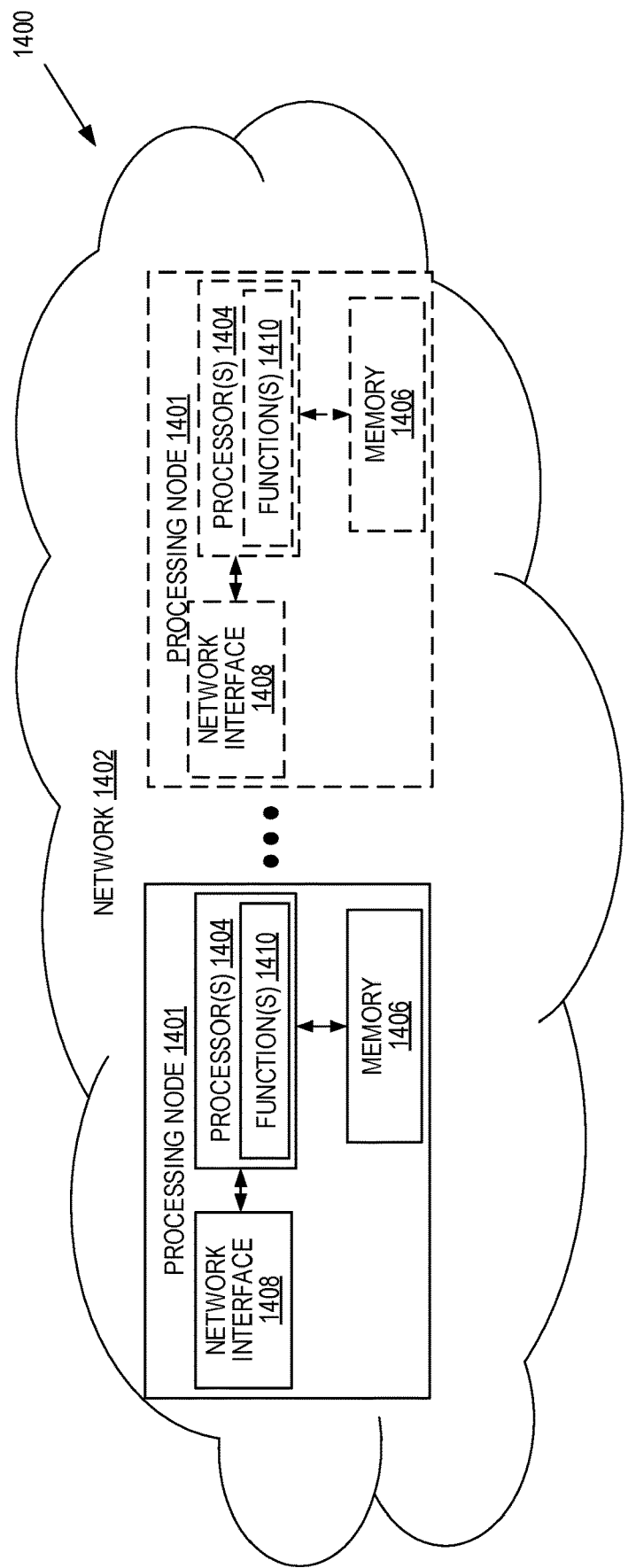
FIG. 14 is a schematic block diagram that illustrates a virtualized embodiment of a network node according to some embodiments of the present disclosure.

FIG. 14 is a schematic block diagram that illustrates a virtualized embodiment of a network node 1400 according to some embodiments of the present disclosure. This discussion is equally applicable to other types of network nodes. Further, other types of network nodes may have similar virtualized architectures.

As used herein, a "virtualized" network node is an implementation of a network node in which at least a portion of the functionality of network node is implemented as a virtual component(s) (e.g., via a virtual machine(s) executing on a physical processing node(s) in a network(s)). As illustrated, in this example, the network node 1400 includes one or more processing nodes 1401 coupled to or included as part of a network(s) 1402. Each processing node 1401 includes one or more processors 1404 (e.g., CPUs, ASICs, FPGAs, and/or the like), memory 1406, and a network interface 1408.

In this example, functions 1410 of the network node 1400 described herein are implemented at the one or more processing nodes 1401 in any desired manner. In some particular embodiments, some or all of the functions 1410 of the network node 1400 described herein are implemented as virtual components executed by one or more virtual machines implemented in a virtual environment(s) hosted by the processing node(s) 1401.

In some embodiments, a computer program including instructions which, when executed by at least one processor, causes the at least one processor to carry out the functionality of a network node (e.g., a chain controller, a service requestor, or a user plane node) according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
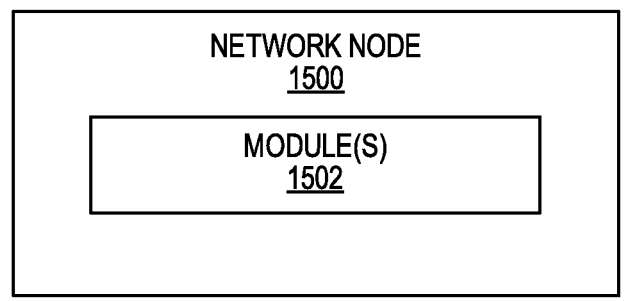
FIG. 15 is a schematic block diagram of a network node according to some other embodiments of the present disclosure.

FIG. 15 is a schematic block diagram of a network node 1500 according to some other embodiments of the present disclosure. The network node 1500 includes one or more modules 1502, each of which is implemented in software. The module(s) 1502 provide the functionality of the network node 1500 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method of operation of a chain controller in a cellular communications network in which a user plane function is decomposed into a plurality of micro user plane functions, comprising:
  receiving, from a service requestor, a service description comprising a set of service template instances having respective service template definitions, wherein:
    each service template definition of the respective service template definitions comprises data that defines a set of micro user plane functions that realize a service or a part of a service;
    each service template instance comprises data that defines a reference to the respective service template definition; and
    at least one of the service template definitions comprises an assign object, the assign object being an object to which the chain controller is to assign an identity;
  generating a service set based on the service description, the service set comprising a list of micro user plane functions, wherein each assign object comprised in the at least one of the service template definitions is associated with at least one of the micro user plane functions in the list of user plane functions;
  assigning each micro user plane function in the list of micro user plane functions comprised in the service set to a user plane node; and
  for each assign object comprised in the at least one of the service template definitions, assigning an allocated identity to the assign object.

Embodiment 2: The method of embodiment 1 further comprising returning the allocated identity(ies) to the service requestor.

Embodiment 3: The method of embodiment 1 or 2 wherein, for each assign object comprised in the at least one of the service template definitions, the assign object defines an identity type for the assign object.

Embodiment 4: The method of embodiment 3 wherein, for each assign object comprised in the at least one of the service template definitions, the assign object defines a pool of identities from which an identity is to be allocated for the assign object.

Embodiment 5: The method of embodiment 4 wherein a user plane node may manage multiple different pools of the same identity type.

Embodiment 6: The method of any one of embodiments 1 to 5 wherein, for at least one of the allocated identities for at least one of the assign objects, the allocated identity is an Internet Protocol, IP, address, an IP address allocated for a user device associated with the service request, or a Tunnel Endpoint Identifier, TEID.

Embodiment 7: The method of any one of embodiments 1 to 6 wherein the service set further comprises one or more ordering constraints for the micro user plane functions comprised in the list of micro user plane functions.

Embodiment 8: A network node that implements a chain controller in a cellular communications network in which a user plane function is decomposed into a plurality of micro user plane functions, the chain controller adapted to perform the method of any one of embodiments 1 to 8.

Embodiment 9: A physical network node on which a chain controller is implemented in a cellular communications network in which a user plane function is decomposed into a plurality of micro user plane functions, the physical network node comprising: a network interface; one or more processors; and memory comprising instructions executable by the one or more processors whereby the physical network node is operable to implement the chain controller, wherein the chain controller is operable to perform the method of any one of embodiments 1 to 8.

Embodiment 10: A method of operation of a service requestor to request a service from a chain controller in a cellular communications network in which a user plane function is decomposed into a plurality of micro user plane functions, comprising:
- sending, to the chain controller, a service description comprising a set of service template instances having respective service template definitions, wherein:
  - each service template definition of the respective service template definitions comprising data that defines a set of micro user plane functions that realize a service or a part of a service;
  - each service template instance comprises data that defines a reference to the respective service template definition; and
  - at least one of the service template definitions comprises an assign object, the assign object being an object to which the chain controller is to assign an identity; and
- receiving, from the chain controller, an allocated identity for the assign object for each of the at least one of the service template definitions that comprise an assign object.

Embodiment 11: A network node that implements a service requestor to request a service from a chain controller in a cellular communications network in which a user plane function is decomposed into a plurality of micro user plane functions, the service requestor adapted to perform the method of embodiment 10.

Embodiment 12: A physical network node on which a service requestor is implemented in a cellular communications network in which a user plane function is decomposed into a plurality of micro user plane functions, the physical network node comprising: a network interface; one or more processors; and memory comprising instructions executable by the one or more processors whereby the physical network node is operable to implement the service requestor, wherein the service requestor is operable to perform the method of embodiment 10.

Embodiment 13: A method of operation of a service requestor to request a service from a chain controller in a cellular communications network in which a user plane function is decomposed into a plurality of micro user plane functions, comprising:
- sending, to the chain controller, a service description or a request to update a service description, wherein:
  - the service description comprises a set of service template instances having respective service template definitions;
  - each service template definition of the respective service template definitions being data that defines a set of micro user plane functions that realize a service or a part of a service; and
  - each service template instance comprises: (a) data that defines a reference to the respective service template definition and (b) one or more input values for one or more input parameters of the respective service template definition.

Embodiment 14: The method of embodiment 13 further comprising receiving a reply from the chain controller.

Embodiment 15: The method of embodiment 13 or 14 further comprising, prior to sending the service description to the chain controller, obtaining a plurality of service template instances for a wireless device, wherein the set of service template instances comprised in the service description comprise some or all of the plurality of service template instances obtained for the wireless device.

Embodiment 16: The method of embodiment 15 further comprising, prior to sending the service description to the chain controller, obtaining one or more parameter values for the plurality of service template instances.

Embodiment 17: The method of embodiment 15 or 16 wherein obtaining the plurality of service template instances for the wireless device comprises obtaining the plurality of service template instances for the wireless device from a network node.

Embodiment 18: The method of any one of embodiments 15 to 17 wherein the plurality of service template instances for the wireless device are from an associated profile of the wireless device.

Embodiment 19: A network node that implements a service requestor to request a service from a chain controller in a cellular communications network in which a user plane function is decomposed into a plurality of micro user plane functions, the service requestor adapted to perform the method of any one of embodiments 13 to 18.

Embodiment 20: A physical network node on which a service requestor is implemented in a cellular communications network in which a user plane function is decomposed into a plurality of micro user plane functions, the physical network node comprising: a network interface; one or more processors; and memory comprising instructions executable by the one or more processors whereby the physical network node is operable to implement the service requestor, wherein the service requestor is operable to perform the method of any one of embodiments 13 to 18.

Embodiment 21: A method of operation of a chain controller in a cellular communications network in which a user plane function is decomposed into a plurality of micro user plane functions, comprising:
- receiving, from a service requestor, a service description comprising a set of service template instances having respective service template definitions, wherein:
  - each service template definition of the respective service template definitions comprising data that defines a set of micro user plane functions that realize a service or a part of a service; and
  - each service template instance comprises data that defines a reference to the respective service template definition;
- generating a service set based on the service description, the service set comprising a list of micro user plane functions, flow causes for the micro user plane functions in the list, and ordering constraints for the micro user plane functions in the list;

assigning the micro user plane functions to one or more user plane nodes;

computing a service chain graph based on the flow causes for the micro user plane functions and the ordering constraints for the micro user plane functions; and providing at least a portion of the service chain graph to each of the one or more user plane nodes to which the micro user plane functions are assigned.

Embodiment 22: The method of embodiment 21 wherein the service chain graph comprises one or more branches, wherein branch is defined as a set of edges and each edge defines a connection between an output port of one micro user plane function to an input port of another micro user plane function.

Embodiment 23: The method of embodiment 21 wherein computing the service chain graph comprises determining the set of edges for each branch of the one or more branches comprised in the service chain graph.

Embodiment 24: The method of embodiment 23 wherein determining the set of edges for each branch of the one or more branches comprised in the service chain graph comprises:

for each entry micro user plane function in the list of micro user plane functions, collecting all other micro user plane functions that have at least one flow cause that refers to that entry micro plane function;

making a sorted list of each collection of micro user plane functions that comply with one or more ordering constraints; and for each sorted list, processing the sorted list to create the set of edges for each of one or more branches found in the sorted list.

Embodiment 25: The method of embodiment 24 wherein processing the sorted list comprises processing the sorted list comprises processing the sorted list in accordance with:

node is operable to implement the chain controller, wherein the chain controller is operable to perform the method of any one of embodiments 21 to 25.

At least some of the following abbreviations may be used in this disclosure. If there is an inconsistency between abbreviations, preference should be given to how it is used above. If listed multiple times below, the first listing should be preferred over any subsequent listing(s).

μUPF Micro User Plane Function
3GPP Third Generation Partnership Project
5G Fifth Generation
5GC Fifth Generation Core Network
AMF Authentication Management Function
ASIC Application Specific Integrated Circuit
BNF Backus-Naur Form
CC Chain Controller
CDN Content Delivery Network
CP-UP Control Plane—User Plane
CPU Central Processing Unit
CUPS Control and User Plane Separation of Evolved Packet Core Nodes
DN Data Network
DSP Digital Signal Processor
eNB Enhanced or Evolved Node B
EPC Evolved Packet Core
FPGA Field Programmable Gate Array
gNB New Radio Base Station
GTP General Packet Radio Service Tunneling Protocol
GTP-U General Packet Radio Service Tunneling Protocol User Plane
ID Identity
IoT Internet of Things
IP Internet Protocol
IPv4 Internet Protocol version 4
IPv6 Internet Protocol version 6

```
create_branches(upf_list, origin_branch_id, origin_filter_expression) {
    1. UPF#1 is the first item in upf_list. Remove that item from upf_list.
    2. Let latest_branch_id=origin_branch_id
    3. For i=0 to (number of UPF#1 ports − 1) {
       3a) Let current_filter_expression=origin_filter_expression.
       3b) If UPF#1 is multiport, append "UPF#1==i" to current_filter_expression.
       3c) Find UPF#2, which is the first item in upf_list that has a flow clause matching
           current_filter_expression. A match means that there is no filter sub-expression in the flow
           clause that contradicts a filter sub-expression of current_filter_expression. Two filter sub-
           expressions a==x contradict when a₁=a₂ and x₁!=x₂.
       3d) If a UPF#2 is found, and UPF#2 is not named "drop", then perform the following steps 3e-
           3f-:
       3e) Create an edge for origin_branch_id from UPF#1 to UPF#2 with UPF#1 output value i if
           multiport. If i>0 the target branch for the edge is ++latest_branch_id, otherwise the target
           branch is latest_branch_id. The created edge is the following: (origin_branch_id, UPF#1, i,
           UPF#2, target_branch)
       3f) Call latest_branch_id = create_branches(upf_list starting from UPF#2, latest_branch_id,
           current_filter_expression)
       }
    4. return latest_branch_id
```

Embodiment 26: A network node that implements a chain controller in a cellular communications network in which a user plane function is decomposed into a plurality of micro user plane functions, the chain controller adapted to perform the method of any one of embodiments 21 to 25.

Embodiment 27: A physical network node on which a chain controller is implemented in a cellular communications network in which a user plane function is decomposed into a plurality of micro user plane functions, the physical network node comprising: a network interface; one or more processors; and memory comprising instructions executable by the one or more processors whereby the physical network MBB Mobile Broadband
MME Mobility Management Entity
NR New Radio
NRF Network Repository Function
PCRF Policy and Charging Rules Function
PDU Protocol Data Unit
PGW-C Packet Data Network Gateway—Control Plane
QoS Quality of Service
RAM Random Access Memory
RAN Radio Access Network
ROM Read Only Memory
RRH Remote Radio Head SBI Southbound Interface
SGW-C Serving Gateway—Control Plane
SMF Session Management Function
SSC Session and Service Continuity
TEID Tunnel Endpoint Identifier
TS Technical Specification
TTM Time-To-Market
UDM Unified Data Management
UE User Equipment
UPF User Plane Function
vBNG Virtual Broadband Network Gateway
VoLTE Voice over Long Term Evolution Those skilled in the art will recognize improvements and modifications to the embodiments of the present disclosure. All such improvements and modifications are considered within the scope of the concepts disclosed herein.

What is claimed is:

1. A method of operation of a service requestor to request a service from a chain controller in a cellular communications network in which a user plane function is decomposed into a plurality of micro user plane functions, comprising:
   sending, to the chain controller, a service description or a request to update a service description, wherein:
      the service description comprises one or more service template instances, the one or more service template instances having respective service template definitions;
      each service template definition of the respective service template definitions being data that defines a set of micro user plane functions that realize a service or a part of a service; and
      each service template instance of the one or more service template instances comprises data that defines a reference to the respective service template definition, and wherein each service template instance of the one or more service template instances further comprises one or more modifiable input values for one or more input parameters of the respective service template definition; and
   receiving a reply from the chain controller.

2. The method of claim 1 further comprising, prior to sending the service description to the chain controller:
   obtaining a plurality of service template instances for a wireless device, wherein the one or more service template instances comprised in the service description comprise some or all of the plurality of service template instances obtained for the wireless device.

3. The method of claim 2 wherein obtaining the plurality of service template instances for the wireless device comprises:
   obtaining a profile of the wireless device, the profile comprising the plurality of service template instances for the wireless device.

4. The method of claim 2 further comprising building the service description, wherein building the service description comprises selecting one or more of the plurality of service template instances for the wireless device as the one or more service template instances for the service description.

5. The method of claim 4 wherein building the service description further comprises mapping at least one parameter value for at least one of the one or more service template instances from information of incoming events.

6. The method of claim 1 further comprising, prior to sending the service description to the chain controller:
   obtaining:
      a plurality of service template instances for a wireless device, wherein the one or more service template instances comprised in the service description comprise some or all of the plurality of service template instances obtained for the wireless device; and
      for each service template instance of at least a subset of the plurality of service template instances for the wireless device, one or more input values for one or more input parameters for the service template instance.

7. The method of claim 6 wherein obtaining the plurality of service template instances for the wireless device and the one or more input values for the one or more input parameters for each of the at least a subset of the plurality of service template instances for the wireless device comprises:
   obtaining a profile of the wireless device, the profile comprising the plurality of service template instances for the wireless device and the one or more input values for the one or more input parameters for each of the at least a subset of the plurality of service template instances for the wireless device.

8. The method of claim 1 wherein one of the one or more service template instances inherits another one of the one or more service template instances.

9. The method of claim 1 wherein the one or more service template instances comprise instances of at least two different service templates.

10. The method of claim 9 further comprising processing the one or more output parameters.

11. The method of claim 1 wherein the reply comprises one or more output parameters.

12. The method of claim 1 wherein:
   the service requestor is a first network function implemented in a first network node comprised in a core network of a cellular communications system; and
   the chain controller and the plurality of micro user plane functions are implemented in one or more second network nodes comprised in the core network.

13. The method of claim 1 wherein:
   the service requestor is a Session Management Function, SMF, comprised in a core network of a Fifth Generation, 5G, cellular communications system; and
   the user plane function that is decomposed into the plurality of micro user plane functions is a User Plane Function, UPF, comprised in the core network of the 5G cellular communications system.

14. A network node on which a service requestor is implemented in a cellular communications network in which a user plane function is decomposed into a plurality of micro user plane functions, the network node comprising:
   a network interface;
   one or more processors; and
   memory comprising instructions executable by the one or more processors whereby the network node is operable to implement the service requestor, wherein the service requestor is operable to:
      send, to a chain controller, a service description or a request to update a service description, wherein:
         the service description comprises one or more service template instances, the one or more service template instances having respective service template definitions;
         each service template definition of the respective service template definitions being data that defines a set of micro user plane functions that realize a service or a part of a service; and
         each service template instance of the one or more service template instances comprises data that defines a reference to the respective service template definition, and wherein each service template instance of the one or more service template instances further comprises one or more modifiable input values for one or more input parameters of the respective service template definition; and receive a reply from the chain controller.

15. A method of operation of a chain controller in a cellular communications network in which a user plane function is decomposed into a plurality of micro user plane functions, comprising:

receiving, from a service requestor, a service description comprising one or more service template instances, the one or more service template instances having respective service template definitions, wherein:

each service template definition of the respective service template definitions comprises data that defines a set of micro user plane functions that realize a service or a part of a service; and each service template instance of the one or more service template instances comprises data that defines a reference to the respective service template definition, and wherein each service template instance of the one or more service template instances further comprises one or more modifiable input values for one or more input parameters of the respective service template definition;

generating a service set based on the service description, the service set comprising a list of micro user plane functions; and assigning each micro user plane function in the list of micro user plane functions comprised in the service set to a user plane node.

16. The method of claim 15 further comprising returning a reply to the service requestor.

17. The method of claim 16 wherein the reply comprises one or more output parameters.

18. The method of claim 15 wherein the service set further comprises one or more ordering constraints for the micro user plane functions comprised in the list of micro user plane functions.

19. The method of claim 15 wherein one of the one or more service template instances inherits another one of the one or more service template instances.

20. The method of claim 15 wherein the one or more service template instances comprise instances of at least two different service templates.

21. The method of claim 15 wherein the reply comprises one or more output parameters.

22. The method of claim 15 wherein:

the service requestor is a first network function implemented in a first network node comprised in a core network of a cellular communications system; and the chain controller and the plurality of micro user plane functions are implemented in one or more second network nodes comprised in the core network.

23. The method of claim 15 wherein:

the service requestor is a Session Management Function, SMF, comprised in a core network of a Fifth Generation, 5G, cellular communications system; and the user plane function that is decomposed into the plurality of micro user plane functions is a User Plane Function, UPF, comprised in the core network of the 5G cellular communications system.

24. A network node on which a chain controller is implemented in a cellular communications network in which a user plane function is decomposed into a plurality of micro user plane functions, the network node comprising:

a network interface;

one or more processors; and memory comprising instructions executable by the one or more processors whereby the network node is operable to implement the chain controller, wherein the chain controller is operable to:

receive, from a service requestor, a service description comprising one or more service template instances, the one or more service template instances having respective service template definitions, wherein:

each service template definition of the respective service template definitions comprises data that defines a set of micro user plane functions that realize a service or a part of a service; and each service template instance of the one or more service template instances comprises data that defines a reference to the respective service template definition, wherein each service template instance of the one or more service template instances further comprises one or more modifiable input values for one or more input parameters of the respective service template definition;

generate a service set based on the service description, the service set comprising a list of micro user plane functions; and assign each micro user plane function in the list of micro user plane functions comprised in the service set to a user plane node.

* * * * *